US012632980B2

(12) United States Patent
Ueda et al.

(10) Patent No.: US 12,632,980 B2
(45) Date of Patent: May 19, 2026

(54) INFORMATION PROCESSING APPARATUS

(71) Applicant: NTT DOCOMO, INC., Tokyo (JP)

(72) Inventors: Kensuke Ueda, Chiyoda-ku (JP);
Nobutaka Matsushima, Chiyoda-ku
(JP); Yuuichi Mizukoshi, Chiyoda-ku
(JP)

(73) Assignee: NTT DOCOMO, INC., Tokyo (JP)

( * ) Notice: Subject to any disclaimer, the term of this
patent is extended or adjusted under 35
U.S.C. 154(b) by 240 days.

(21) Appl. No.: 18/704,760

(22) PCT Filed: Oct. 28, 2022

(86) PCT No.: PCT/JP2022/040396
§ 371 (c)(1),
(2) Date: Nov. 11, 2024

(87) PCT Pub. No.: WO2023/074852
PCT Pub. Date: May 4, 2023

(65) Prior Publication Data
US 2025/0069251 A1      Feb. 27, 2025

(30) Foreign Application Priority Data

Oct. 29, 2021     (JP) ................................. 2021-177823

(51) Int. Cl.
*G06T 7/70* (2017.01)
*G06V 40/10* (2022.01)
(52) U.S. Cl.
CPC ................ *G06T 7/70* (2017.01); *G06V 40/10*
(2022.01); *G06T 2207/30196* (2013.01); *G06T
2207/30244* (2013.01)
(58) Field of Classification Search
CPC ............. G06T 7/70; G06T 2207/30196; G06T
2207/30244; G06T 2207/20081;
(Continued)

(56) References Cited

U.S. PATENT DOCUMENTS

| | | | |
|---|---|---|---|
| 11,402,871 B1 * | 8/2022 | Berliner ................... | G06F 3/02 |
| 2019/0101758 A1 * | 4/2019 | Zhu ........................... | G06T 3/00 |

(Continued)

FOREIGN PATENT DOCUMENTS

JP          6928217 B1     9/2021

OTHER PUBLICATIONS

International Search Report mailed on Jan. 24, 2023 in PCT/JP2022/
040396 filed on Oct. 28, 2022, (4 Pages with English translation).

*Primary Examiner* — Shahbaz Nazrul
(74) *Attorney, Agent, or Firm* — Oblon, McClelland,
Maier & Neustadt, L.L.P.

(57)          ABSTRACT

An information processing apparatus includes: an acquirer
configured to acquire (i) captured image information indi-
cating an image captured by an image capture device, (ii)
image capture position information indicating a position of
the image capture device, and (iii) provisional position
information indicating a position of a wearable device; an
identifier configured to identify, based on the captured image
information and the provisional position information, a
person wearing the wearable device, from among persons
indicated by one or more person images included in the
captured image; a calculator configured to calculate self-
position information indicating a position of the wearable
device worn by the person identified by the identifier, using
the image capture position information; and a transmitter
configured to supply the self-position information to the
wearable device. The image capture position information is
higher in accuracy than the provisional position information.

8 Claims, 11 Drawing Sheets

(58) Field of Classification Search
CPC ..... G06V 40/10; G02B 27/0093; G06F 3/011;
G06F 3/013; H04N 23/661; G01B 11/00
See application file for complete search history.

(56) References Cited

U.S. PATENT DOCUMENTS

2020/0117270  A1 *    4/2020   Gibson ................... G06F 3/011
2022/0255995  A1 *    8/2022   Berliner ............. G06F 3/04883
2024/0098232  A1 *    3/2024   Piuze-Phaneuf ..... H04N 13/111
2024/0112428  A1 *    4/2024   Levi ................... G06F 3/04815

* cited by examiner

40

INFORMATION PROCESSING APPARATUS

TECHNICAL FIELD

The present invention relates to information processing apparatuses.

BACKGROUND ART

In a mixed reality (MR) technology, a real environment perceivable by a user is extended using a computer. The use of this technology enables, for example, precise superimposition of a virtual space on a real space to be visually recognized by a user through a pair of MR glasses mounted on the user's head.

It is necessary for the pair of MR glasses to acquire an accurate position of the pair of MR glasses in order to precisely superimpose the virtual space on the real space.

With regard to a technique for superimposing a virtual space on a real space, for example, Patent Document 1 discloses a technique of replacing position coordinates in a virtual space with information on a latitude, a longitude, and an altitude in a real space. According to the technique disclosed in Patent Document 1, specifically, a device for measurement processing acquires, from a position-measuring device that measures a latitude, a longitude, and an altitude, position coordinates of a measurement point measured as a position of the position-measuring device in a real space. The device for measurement processing images the position-measuring device. The device for measurement processing associates position coordinates of the imaged position-measuring device in a virtual space with position coordinates of the measurement point in the real space to generate a correspondence table. The device for measurement processing transforms coordinates of three-dimensional point cloud data in the virtual space to position coordinates in the real space by a predetermined transformation equation generated using the correspondence table.

RELATED ART DOCUMENT

Patent Document

Patent Document 1: Japanese Patent No. 6928217

SUMMARY OF THE INVENTION

Problem to be Solved by the Invention

According to the technique disclosed in Patent Document 1, however, the device for measurement processing fails to accurately transform the coordinates of the three-dimensional point cloud data in the virtual space to the coordinates in the real space unless the position-measuring device accurately measures the latitude, the longitude, and the altitude as the position of the position-measuring device. When the technique disclosed in Patent Document 1 is applied to a pair of MR glasses, the virtual space that is not precisely superimposed on the real space is displayed on the pair of MR glasses. For example, a virtual object is displayed on the pair of MR glasses at a position different from a position where a virtual space-related service provider intends to display the virtual object.

The present invention provides an information processing apparatus that allows a pair of MR glasses to acquire its position more accurately.

Means for Solving the Problem

An information processing apparatus according to a preferable aspect of the present invention is an information processing apparatus including: an acquirer configured to acquire captured image information indicating an image captured by an image capture device, image capture position information indicating a position of the image capture device, and provisional position information indicating a position of a wearable device; an identifier configured to identify, based on the captured image information and the provisional position information, a person wearing the wearable device, from one or more person images included in the captured image; a calculator configured to calculate self-position information indicating a position of the wearable device worn by the person identified by the identifier, using the image capture position information; and a transmitter configured to supply the self-position information to the wearable device. The image capture position information is higher in accuracy than the provisional position information.

Effect of the Invention

According to the present invention, a pair of MR glasses is configured to acquire its position more accurately.

MODES FOR CARRYING OUT THE INVENTION

1: First Embodiment

With reference to FIGS. 1 to 10, a description will be given of a configuration of an information processing system 1 including an information processing apparatus 10 according to a first embodiment of the present invention.

Figure 1:
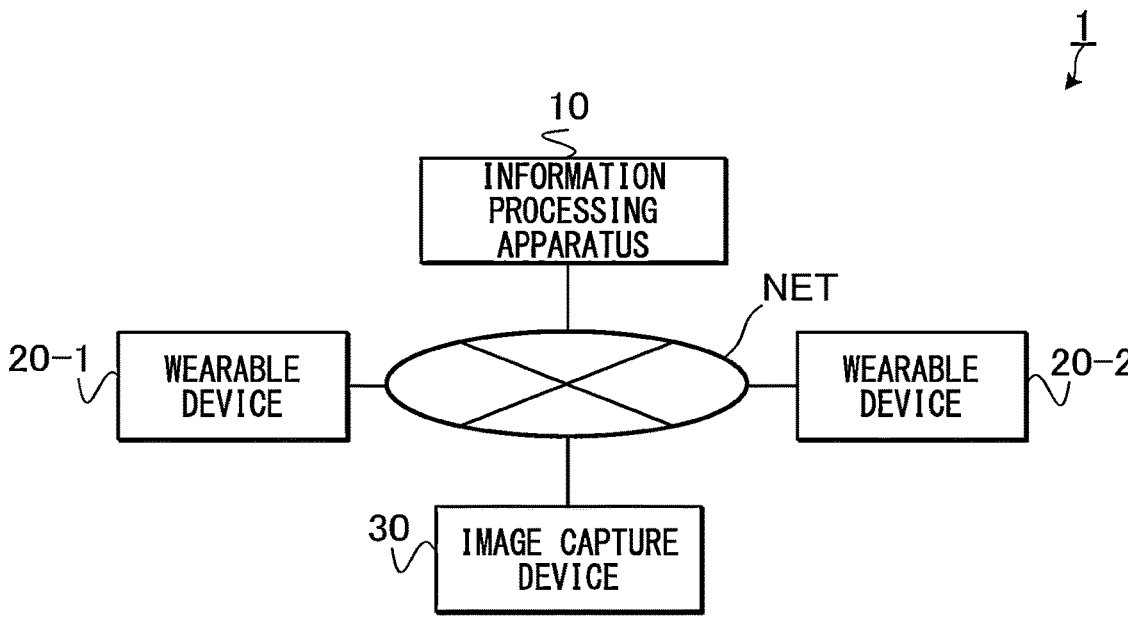
FIG. 1 is a diagram illustrating a general configuration of an information processing system 1 according to a first embodiment.

1.1: Configuration According to First Embodiment 1.1.1: General Configuration FIG. 1 is a diagram illustrating a general configuration of the information processing system 1 according to the first embodiment of the present invention. The information processing system 1 provides a virtual space to a user U1 wearing a pair of MR glasses 50 (to be described later), using an MR technology. The term "MR technology" as used herein refers to a technology that allows a user wearing, for example, a head-mounted display of a see-through type to experience a combination of a real world with a virtual world, by precisely superimposing a coordinate space in the virtual world on a coordinate space in the real world. Examples of the MR technology may include an augmented reality (AR) technology and a virtual reality (VR) technology.

The information processing system 1 includes the information processing apparatus 10, a wearable device 20, and an image capture device 30. The information processing apparatus 10, the wearable device 20, and the image capture device 30 are connected to each other so that the information processing apparatus 10, the wearable device 20, and the image capture device 30 are configured to communicate with each other via a communication network NET. The information processing system 1 illustrated in FIG. 1 includes two wearable devices 20, that is, a wearable device 20-1 and a wearable device 20-2. However, the number of wearable devices 20 is merely an example. For example, the information processing system 1 may include a given number of wearable devices 20.

Figure 2:
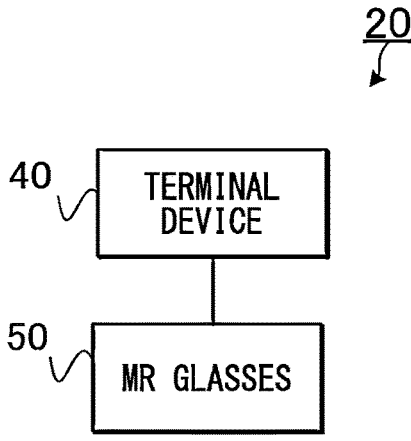
FIG. 2 is a block diagram illustrating a configuration example of a wearable device 20 according to the first embodiment.

The wearable device 20 is worn by a user so that the user perceives a virtual space. FIG. 2 is a block diagram illustrating a configuration example of the wearable device 20. The wearable device 20 includes a terminal device 40 and the pair of MR glasses 50. The terminal device 40 and the pair of MR glasses 50 are connected to each other so that the terminal device 40 and the pair of MR glasses 50 are configured to communicate with each other. The terminal device 40 is connected to the information processing apparatus 10 so as to be configured to communicate with the information processing apparatus 10. The terminal device 40 thus acquires from the information processing apparatus 10 image information to be displayed on the pair of MR glasses 50. The terminal device 40 displays on the pair of MR glasses 50 the image information acquired from the information processing apparatus 10.

The terminal device 40 displays a virtual object placed in a virtual space, on the pair of MR glasses 50 mounted on a user's head. The virtual space is, for example, a dome-shaped virtual space. The virtual object represents, for example, data such as a still image, a moving image, a 3DCG model, an HTML file, or a text file. The virtual object represents, for example, an application. Examples of the text file may include a memo, a source code, a diary, and a recipe. Examples of the application may include a browser, an application for utilizing an SNS, and an application for generating a document file. Preferable examples of the terminal device 40 may include mobile terminal devices such as a smartphone and a tablet.

The pair of MR glasses 50 is a wearable display of a see-through type mountable to a user's head. The pair of MR glasses 50 is controlled by the terminal device 40 to display a virtual object on a display panel disposed on a left-eye lens and a display panel disposed on a right-eye lens. In the present invention, a position of the pair of MR glasses 50 is regarded as a position of the wearable device 20.

Referring back to FIG. 1, the information processing apparatus 10 provides various kinds of data and cloud services to the terminal device 40 via the communication network NET. The information processing apparatus 10 calculates self-position information indicating an absolute position of the wearable device 20 in a global coordinate system. The information processing apparatus 10 outputs the calculated self-position information to the wearable device 20. The global coordinate system in the present embodiment refers to a coordinate system representing the entire space including the wearable device 20 and the image capture device 30.

The image capture device 30 captures an image of a person wearing the wearable device 20. Specifically, the image capture device 30 is, for example, a stereo camera. The image capture device 30 is configured to capture an image of the person wearing the wearable device 20 and to acquire vector information indicating a distance from the image capture device 30 to the image capture target and a direction of the image capture target relative to the image capture device 30. More specifically, as an example, pixels constituting a captured image captured by the image capture device 30 are respectively associated with multiple pieces of vector information each indicating a distance from the image capture device 30 to the corresponding pixel and a direction of the corresponding pixel relative to the image capture device 30. Captured image information indicates the following: a captured image captured by the image capture device 30, a distance from the image capture device 30 to an image capture target, and a direction of the image capture target relative to the image capture device 30. The captured image information is supplied to the information processing apparatus 10 via the communication network NET. The image capture device 30 is installed fixedly. The captured image information supplied from the image capture device 30 and indicating the captured image and distance information is an example of second captured image information (to be described later).

1.1.2: Configuration of Pair of MR Glasses

Figure 3:
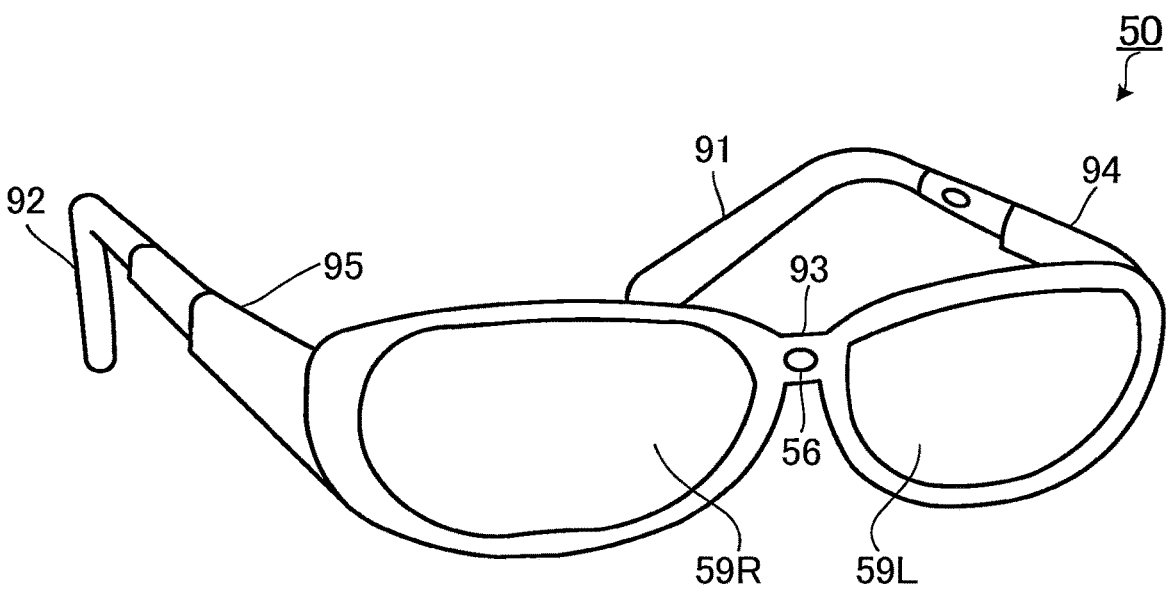
FIG. 3 is a perspective view illustrating an appearance of a pair of MR glasses 50 according to the first embodiment.

FIG. 3 is a perspective view illustrating an appearance of the pair of MR glasses 50. As illustrated in FIG. 3, the pair of MR glasses 50 is similar in appearance to a typical pair of glasses, and includes temple tips 91 and 92, a nose bridge 93, temples 94 and 95, and lenses 59L, and 59R. The nose bridge 93 is provided with an image capture device 56. The image capture device 56 captures an image of the outside, and then outputs captured image information indicating the captured image. The captured image information output from the image capture device 56 and indicating the captured image is an example of first captured image information (to be described later).

The lenses 59L and 59R each include a half mirror. The temple 94 is provided with a left-eye liquid crystal panel or organic EL panel (hereinafter, such a panel will collectively be referred to as a display panel), and an optical member that guides light emitted from the left-eye display panel to the lens 59L. The half mirror on the lens 59L allows outside light to transmit therethrough, and guides the outside light to the left eye. The half mirror reflects the light guided by the optical member, and causes the reflected light to enter the left eye. The temple 95 is provided with a right-eye display panel, and an optical member that guides light emitted from the right-eye display panel to the lens 59R. The half mirror on the lens 59R allows outside light to transmit therethrough, and guides the outside light to the right eye. The half mirror reflects the light guided by the optical member, and causes the reflected light to enter the right eye.

A display 58 (to be described later) includes the lens 59L, the left-eye display panel, the left-eye optical member, the lens 59R, the right-eye display panel, and the right-eye optical member.

According to such a configuration, the user is able to observe the image displayed on each display panel in a see-through manner with the image superimposed on the state of the outside. With regard to the left-eye image and the right-eye image with parallax, the pair of MR glasses 50 displays the left-eye image on the left-eye display panel and displays the right-eye image on the right-eye display panel. The pair of MR glasses 50 thus allows the user U1 to perceive as if the displayed image has a depth and a stereoscopic effect.

Figure 4:
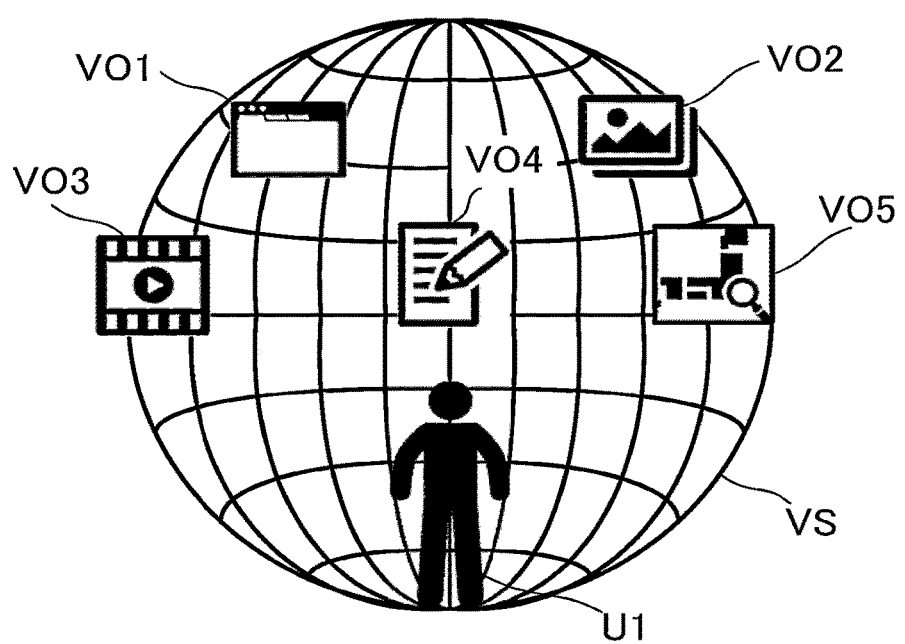
FIG. 4 is a schematic diagram illustrating a virtual space VS provided to a user U1 through the pair of MR glasses 50.
Figure 5:
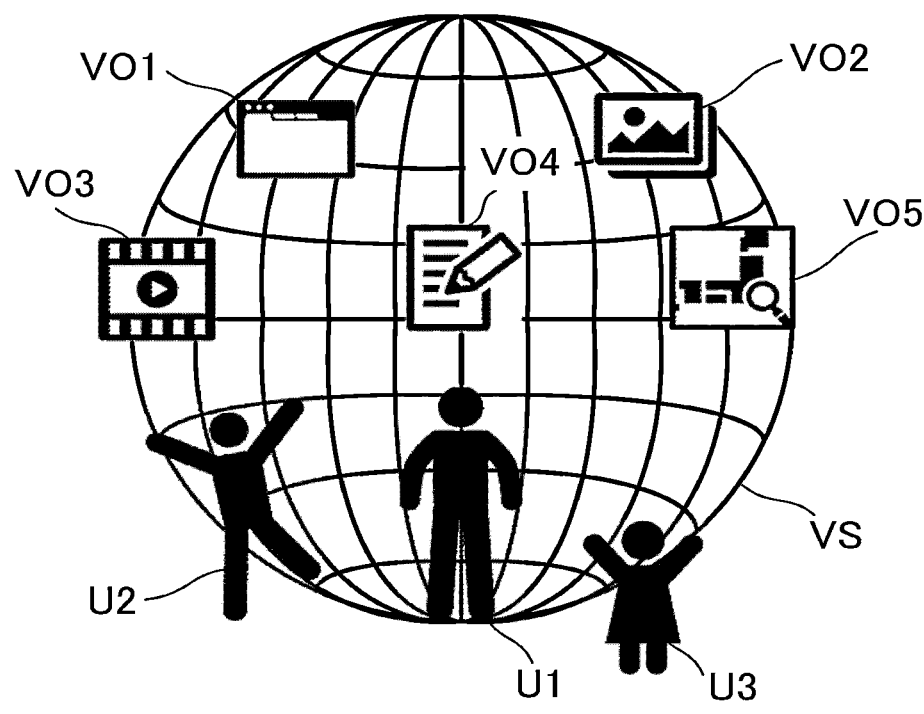
FIG. 5 is a schematic diagram illustrating the virtual space VS provided to the user U1 through the pair of MR glasses 50.
Figure 6:
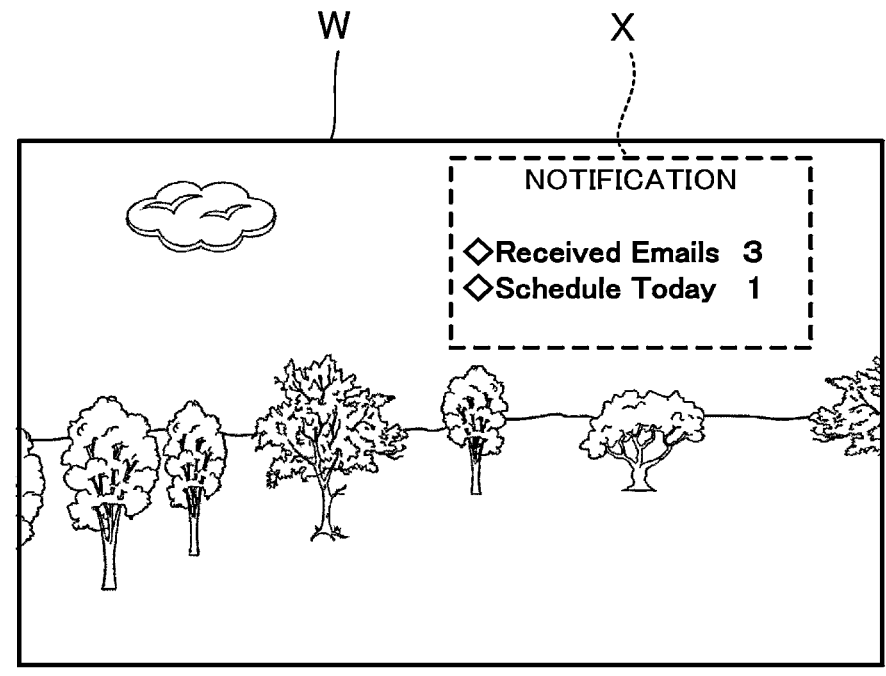
FIG. 6 is a schematic diagram illustrating the virtual space VS provided to the user U1 through the pair of MR glasses 50.

FIGS. 4 to 6 are schematic diagrams each illustrating a virtual space VS provided to the user U1 through the pair of MR glasses 50. As illustrated in FIG. 4, virtual objects VO1 to VO5 indicating various contents such as a browser, a cloud service, an image, and a moving image are arranged in the virtual space VS. The user U1 wearing the pair of MR glasses 50 on which the virtual objects VO1 to VO5 arranged in the virtual space VS are displayed enters and exits a public space to thereby experience the virtual space VS as a private space in the public space. In turn, the user U1 is able to act in the public space while enjoying the benefits of the virtual objects VO1 to VO5 arranged in the virtual space VS.

As illustrated in FIG. 5, the virtual space VS is sharable among a plurality of users U1 to U3. When the virtual space VS is shared among the plurality of users U1 to U3, one or more virtual objects VO are shared among the plurality of users U1 to U3. Therefore, the users U1 to U3 are able to engage in communication with each other, using the shared virtual objects VO.

As illustrated in FIG. 6, for example, a landscape image W and a text box X are displayed on the pair of MR glasses 50. The landscape image W is displayed as a real space. The textbox X notifies the user of the number of received e-mails and the day's schedule. The textbox X is superimposed on the landscape image W. In the present embodiment, the textbox X is displayable on a region in which no obstacle is present in the landscape image W, that is, a blue sky region in the example illustrated in FIG. 6, using the MR technology.

Figure 7:
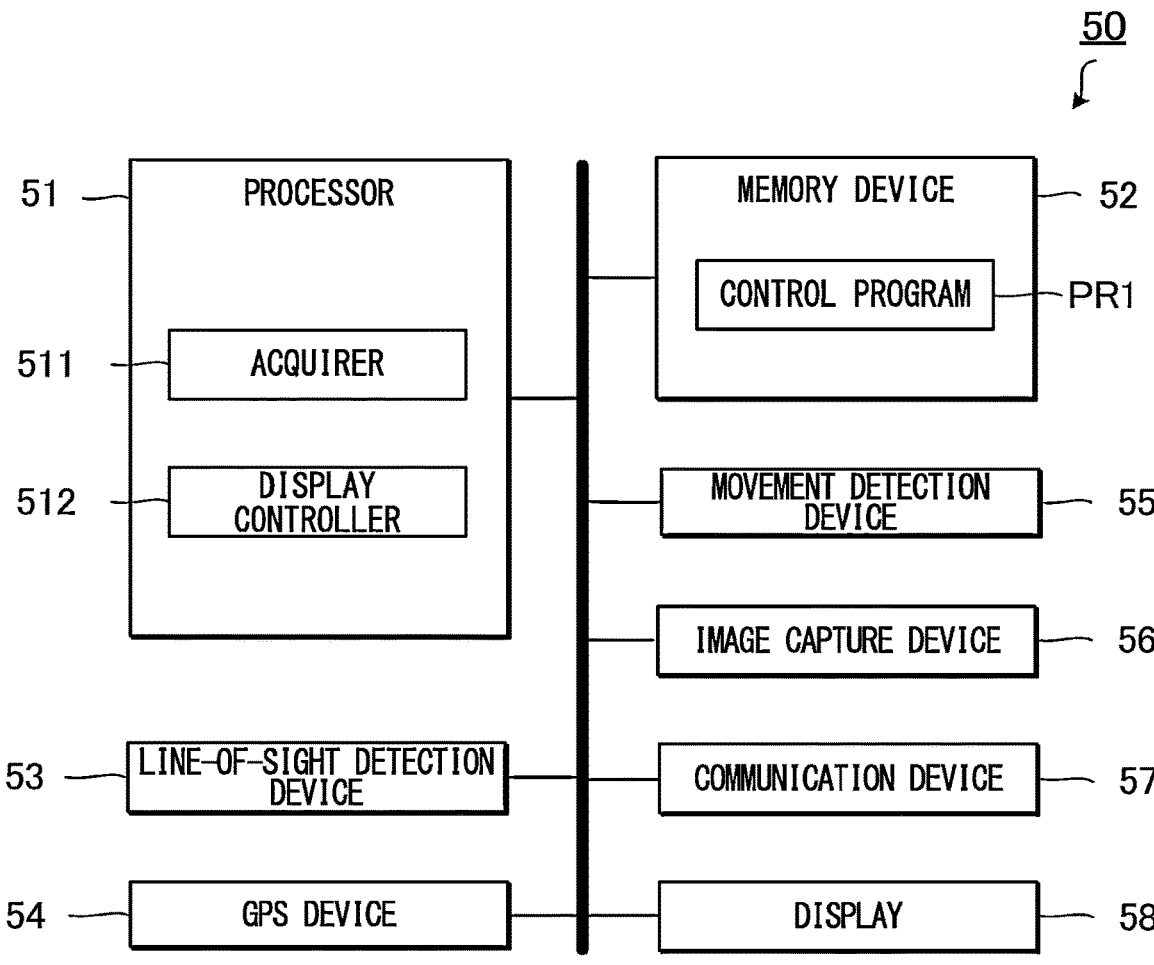
FIG. 7 is a block diagram illustrating a configuration example of the pair of MR glasses 50.

FIG. 7 is a block diagram illustrating a configuration example of the pair of MR glasses 50. The pair of MR glasses 50 includes a processor 51, a memory device 52, a line-of-sight detection device 53, a GPS device 54, a movement detection device 55, the image capture device 56, a communication device 57, and the display 58. These elements of the pair of MR glasses 50 are mutually connected with one or more buses for communicating information. The term "apparatus" in the present specification may be replaced with another term such as "circuit", "device", or "unit".

The processor 51 controls the entire pair of MR glasses 50 and includes, for example, one or more chips. For example, the processor 51 includes an interface with a peripheral apparatus, and a central processing unit (CPU) including an arithmetic-logic unit, a register. One, some, or all of the functions of the processor 51 may be implemented using hardware such as a digital signal processor (DSP), an application specific integrated circuit (ASIC), a programmable logic device (PLD), or a field programmable gate array (FPGA). The processor 51 performs various kinds of processing in parallel or sequentially.

The memory device 52 is a recording medium that is readable, and is writable on, by the processor 51, and it stores a plurality of programs including a control program PR1 to be executed by the processor 51.

The line-of-sight detection device 53 detects a line of sight of the user U1, and then supplies to the processor 51 (to be described later) line-of-sight information indicating the line of sight of the user U1, based on a result of the detection. The line-of-sight detection device 53 may detect a line of sight by a given method. For example, the line-of-sight detection device 53 may detect line-of-sight information, based on position of an eye's inner corner and position of an iris.

The GPS device 54 receives radio waves from a plurality of satellites, and generates first position information from the received radio waves. Position information indicates a position of the pair of MR glasses 50. The first position information may have a given format as long as a position can be identified from the first position information. The first position information indicates, for example, a latitude and a longitude of the pair of MR glasses 50. The first position information may indicate an altitude in addition to the latitude and longitude of the pair of MR glasses 50. For example, the first position information is obtained from the GPS device 54. However, the pair of MR glasses 50 may acquire the first position information by a particular method. The acquired first position information is supplied to the processor 51 as provisional position information indicating a position of the wearable device 20.

The movement detection device 55 detects a movement of the pair of MR glasses 50, and then supplies to the processor 51 movement information indicating the movement. The movement detection device 55 is an inertia sensor. Examples of the inertia sensor include, but not limited to, an acceleration sensor that detects an acceleration and a gyro sensor that detects an angular acceleration. The acceleration sensor detects accelerations along an X-axis, a Y-axis, and a Z-axis that are orthogonal to each other. The gyro sensor detects angular accelerations with the X-axis, Y-axis, and Z-axis as axes of rotation. The movement detection device 55 is configured to generate orientation information indicating an orientation of the pair of MR glasses 50, based on output information from the gyro sensor. Movement data includes acceleration data indicating the accelerations along the three axes and angular acceleration data indicating the angular accelerations about the three axes.

The image capture device 56 outputs first captured image information indicating a captured image as an image of the outside. The image capture device 56 includes, for example, a lens, an imaging element, an amplifier, and an AD converter. The lens focuses light. The imaging element transforms the focused light into an image capture signal that is an analog signal. The amplifier amplifies the image capture signal, and outputs the amplified image capture signal to the AD converter. The AD converter converts the amplified image capture signal that is an analog signal into first captured image information that is a digital signal. The converted first captured image information is supplied to the processor 51. The processor 51 supplies the first captured image information to the terminal device 40 via the communication device 57. The terminal device 40 recognizes various gestures by the user U1, based on the first captured image information, and controls the terminal device 40 in accordance with the recognized gestures. That is, the image capture device 56 acts as an input device, such as a pointing device or a touch panel, through which the user U1 inputs an instruction.

The communication device 57 is hardware serving as a transmission and reception device for communicating with another apparatus. For example, the communication device 57 is called a network device, a network controller, a network card, a communication module, or the like. The communication device 57 may include a connector for wire connection, and it may include an interface circuit compatible with the connector. The communication device 57 may include a wireless communication interface. Examples of the connector for wire connection and interface circuit may include products conforming to a wired LAN, IEEE 1394, and a USB. Examples of the wireless communication interface may include products conforming to a wireless LAN, and Bluetooth (registered trademark).

The display 58 is a device that displays an image. The display 58 is controlled by the processor 51 to display various images. As described above, the display 58 includes the lens 59L, the left-eye display panel, the left-eye optical member, the lens 59R, the right-eye display panel, and the right-eye optical member. Preferable examples of the display panel may include various display panels such as a liquid crystal display panel and an organic EL display (OLED) panel.

The processor 51 reads, for example, the control program PR1 from the memory device 52 and executes the control program PR1 to thereby function as an acquirer 511 and a display controller 512.

The acquirer 511 acquires a control signal from the terminal device 40. More specifically, the acquirer 511 acquires a control signal that is generated by a display controller 415 (to be described later) of the terminal device 40 and is used for controlling display on the pair of MR glasses 50.

The acquirer 511 acquires line-of-sight information received from the line-of-sight detection device 53, position information received from the GPS device 54, movement information received from the movement detection device 55, and first captured image information received from the image capture device 56. The acquirer 511 then supplies the acquired line-of-sight information, first position information, movement information, and captured image information to the communication device 57. The communication device 57 transmits to the terminal device 40 the line-of-sight information, first position information, movement information, and captured image information acquired from the acquirer 511. The acquirer 511 stores the acquired line-of-sight information, first position information, movement information, and captured image information in the memory device 52.

The acquirer 511 acquires second position information as self-position information indicating a position of the wearable device 20, from the terminal device 40 through the communication device 57. The acquirer 511 stores the acquired second position information in the memory device 52. The second position information is higher in accuracy than the first position information. Specifically, the first position information is GPS information obtained from the GPS device 54 as described above. A typical GPS device may cause an error of about 100 m. On the other hand, the second position information is self-position information which the pair of MR glasses 50 acquires from the information processing apparatus 10 via the terminal device 40. As will be described later, the self-position information is calculated using relative position information indicating a position of the pair of MR glasses 50 relative to the image capture device 30. The relative position information is measured by the image capture device 30 such as a stereo camera, Even if a distance from the image capture device 30 to the image capture target is about 100 m, the relative position information has an error within at most ±1 m.

The display controller 512 controls display on the display 58, based on the control signal from the terminal device 40, the control signal being acquired by the acquirer 511.

1.1.3: Configuration of Terminal Device

Figure 8:
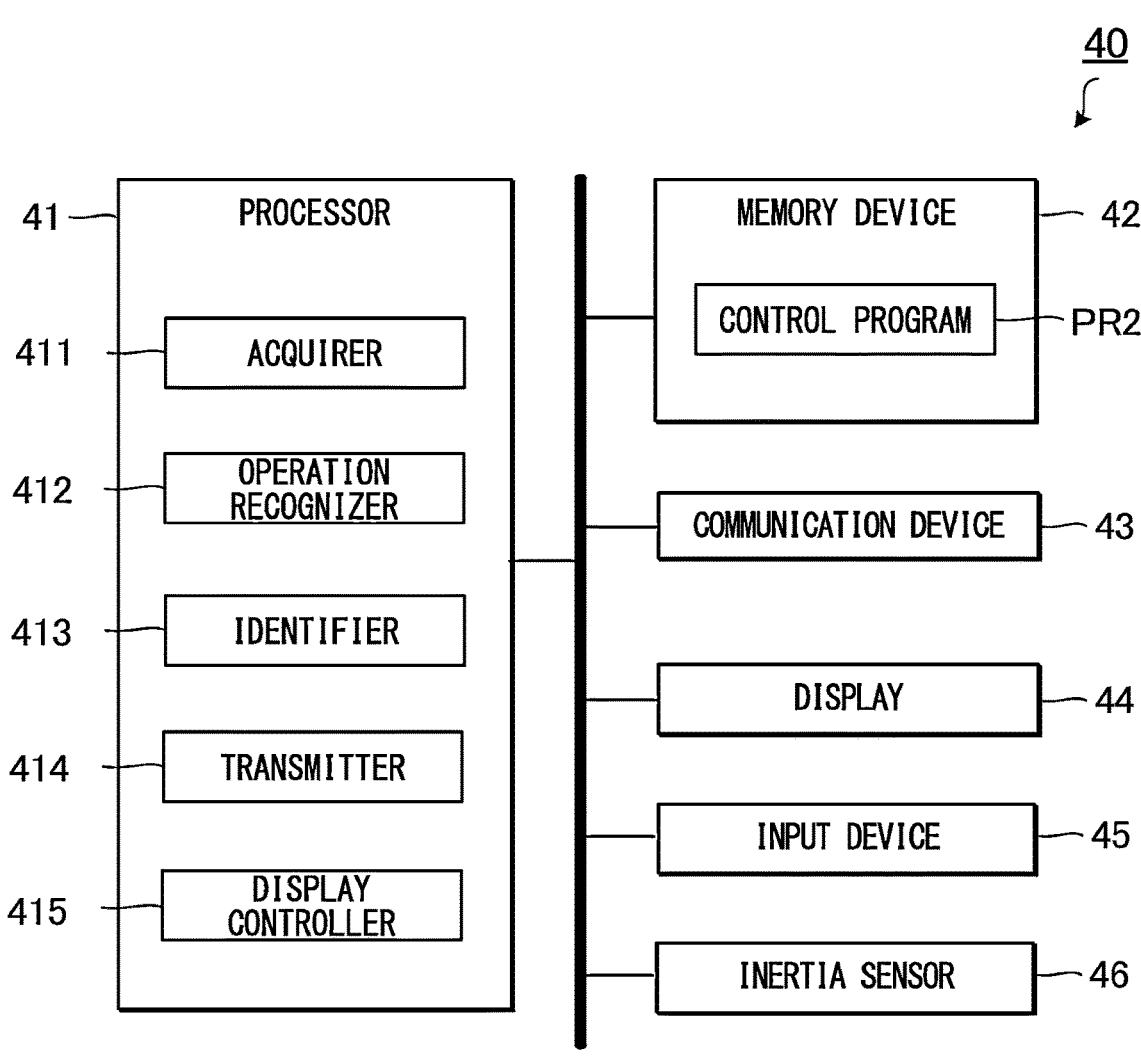
FIG. 8 is a block diagram illustrating a configuration example of a terminal device 40 according to the first embodiment.

FIG. 8 is a block diagram illustrating a configuration example of the terminal device 40. The terminal device 40 includes a processor 41, a memory device 42, a communication device 43, a display 44, an input device 45, and an inertia sensor 46. These elements of the terminal device 40 are mutually connected with one or more buses for communicating information.

The processor 41 controls the entire terminal device 40 and includes one or more chips. The processor 41 includes an interface with a peripheral apparatus, and a CPU including an arithmetic-logic unit, and a register. One, some, or all the functions of the processor 11 may be implemented by hardware such as a DSP, an ASIC, a PLD, or an FPGA. The processor 41 performs various kinds of processing in parallel or sequentially.

The memory device 42 is a recording medium that is readable, and is writable to, by the processor 41, and stores a plurality of programs including a control program PR2 to be executed by the processor 41.

The communication device 43 is hardware serving as a transmission and reception device for communicating with another apparatus. For example, the communication device 43 is called a network device, a network controller, a network card, a communication module, or the like. The communication device 43 may include a connector for wire connection, and it may include an interface circuit compatible with the connector. The communication device 43 may include a wireless communication interface. Examples of the connector for wire connection and interface circuit may include products conforming to a wired LAN, IEEE 1394, and a USB. Examples of the wireless communication interface may include products conforming to a wireless LAN, and Bluetooth (registered trademark).

The display 44 is a device that displays an image and text information. The display 44 is controlled by the processor 41 to display various images. Preferable examples of the display 44 may include various display panels such as a liquid crystal display panel and an organic electroluminescence (EL) display panel.

The input device 45 receives a manipulation by the user U1 wearing the pair of MR glasses 50 on the head. For example, the input device 45 includes a pointing device such as a keyboard, a touch pad, a touch panel, or a mouse. The input device 45 that includes a touch panel may serve as the display 44.

The inertia sensor 46 detects an inertial force. The inertia sensor 46 includes one or more sensors among, for example, an acceleration sensor, an angular velocity sensor, and a gyro sensor. The processor 41 detects an orientation of the terminal device 40, based on output information from the inertia sensor 46. The processor 41 receives selection of a virtual object VO, input of a character, and input of an instruction in the dome-shaped virtual space VS, based on the orientation of the terminal device 40. For example, the user U1 manipulates the input device 45 with a central axis of the terminal device 40 directed to a predetermined region in the virtual space VS, thereby selecting a virtual object VO in the predetermined region. The manipulation on the input device 45 by the user U1 is, for example, a double tap. The user U1 manipulates the terminal device 40 as described above, thereby selecting a virtual object VO without looking at the input device 45 of the terminal device 40.

The processor 41 reads the control program PR2 from the memory device 42 and executes the control program PR2 to thereby function as an acquirer 411, an operation recognizer 412, an identifier 413, a transmitter 414, and a display controller 415.

The acquirer 411 acquires instruction information according to operation by the user U1 wearing the pair of MR glasses 50 on the head. The operation by the user U1 is, for example, inputting, by the user U1, an instruction to the terminal device 40 through the input device 45. More specifically, the operation by the user U1 may be pressing a portion identified as the input device 45 of the terminal device 40. Alternatively, the operation by the user U1 may be a manipulation using the terminal device 40 as a mobile controller. In these cases, the instruction information designates a specific virtual object VO, and information for changing display of the specific virtual object VO. When the specific virtual object VO is an application, the instruction information is information for staring the application.

The operation by the user U1 may be visual observation of the pair of MR glasses 50 by the user U1. When the operation by the user U1 is the visual observation, the instruction information is a viewpoint of the user U1 on the pair of MR glasses 50. In this case, the instruction information is transmitted from the pair of MR glasses 50 to the terminal device 40.

As another alternative, the operation by the user U1 may be a gesture by the user U1. As will be described later, the operation recognizer 412 recognizes various gestures by the user U1. The acquirer 411 may acquire instruction information according to the various gestures by the user U1.

The acquirer 411 acquires first captured image information, and first position information as provisional position information from the pair of MR glasses 50 through the communication device 43.

The acquirer 411 acquires second position information as self-position information indicating a position of the wearable device 20, from the information processing apparatus 10 through the communication device 43. When the terminal device 40 displays the virtual objects VO on the pair of MR glasses 50, the self-position information acquired by the acquirer 411 is used for precisely aligning the virtual space in which the virtual objects VO are displayed, with the real space visually recognized by the user through the pair of MR glasses 50.

The operation recognizer 412 recognizes the various gestures by the user U1, based on the captured image information received from the pair of MR glasses 50. More specifically, as described above, the image capture device 56 of the pair of MR glasses 50 outputs captured image information obtained by capturing an image of the outside. When the captured image data includes a part of the body of the user U1 wearing the pair of MR glasses 50 on the head, the operation recognizer 412 recognizes the various gestures by the user U1, based on the captured image data acquired from the pair of MR glasses 50.

The identifier 413 identifies one of the plurality of virtual objects VO arranged in the virtual space VS, based on the instruction information acquired by the acquirer 411.

When the instruction information acquired by the acquirer 411 is information for changing display of the one virtual object VO identified by the identifier 413 or information for activating the one virtual object VO, the transmitter 414 supplies the instruction information to the information processing apparatus 10. The information processing apparatus 10 changes display of the identified one virtual object VO or activates the identified one virtual object VO, based on the instruction information acquired from the terminal device 40.

The transmitter 414 transmits to the information processing apparatus 10 the first captured image information acquired by the acquirer 411 from the pair of MR glasses 50. The transmitter 414 transmits to the information processing apparatus 10 the first position information acquired by the acquirer 411 from the pair of MR glasses 50 as provisional position information on the wearable device 20.

The transmitter 414 supplies to the pair of MR glasses 50 of the wearable device 20 the second position information acquired by the acquirer 411 from the information processing apparatus 10 as self-position information on the wearable device 20. More specifically, the information processing apparatus 10 calculates the second position information that is higher in accuracy than the first position information, by a method to be described later. The acquirer 411 acquires the second position information from the information processing apparatus 10. The transmitter 414 supplies the second position information to the pair of MR glasses 50 of the wearable device 20.

The display controller 415 causes the pair of MR glasses 50 serving as a display device to display the plurality of virtual objects VO arranged in the virtual space VS. More specifically, the display controller 415 generates image data to be displayed on the pair of MR glasses 50, and then transmits the generated image data to the pair of MR glasses 50 via the communication device 13.

Although not illustrated in FIG. 8, the terminal device 40 may include the same GPS device as the GPS device 54 of the pair of MR glasses 50. In this case, the pair of MR glasses 50 does not necessarily include the GPS device 54.

1.1.4: Configuration of Information Processing Apparatus

Figure 9:
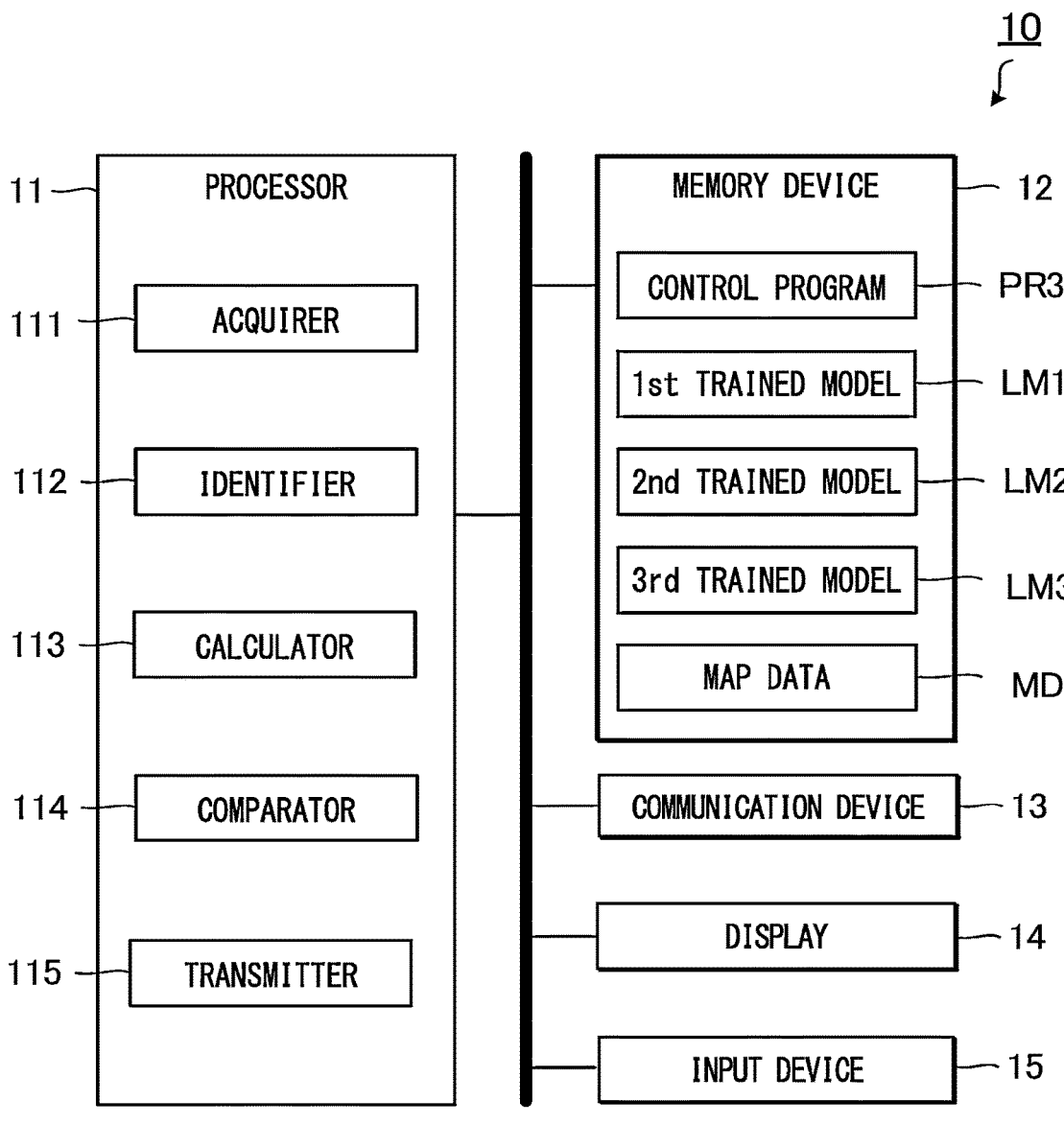
FIG. 9 is a block diagram illustrating a configuration example of an information processing apparatus 10 according to the first embodiment.

FIG. 9 is a block diagram illustrating a configuration example of the information processing apparatus 10. The information processing apparatus 10 includes a processor 11, a memory device 12, a communication device 13, a display 14, and an input device 15. These elements of the information processing apparatus 10 are mutually connected with one or more buses for communicating information.

The processor 11 controls the entire information processing apparatus 10 and includes, for example, one or more chips. For example, the processor 11 includes an interface with a peripheral apparatus, and a CPU including an arithmetic-logic unit, and a register. One, some, or all the functions of the processor 11 may be implemented by hardware such as a DSP, an ASIC, a PLD, or an FPGA. The processor 11 performs various kinds of processing in parallel or in succession.

The memory device 12 is a recording medium readable and writable by the processor 11, and stores a plurality of programs including a control program PR3 to be executed by the processor 11, a first trained model LM1, a second trained model LM2, a third trained model LM3, map data MD, and image capture position information indicating an absolute position of the image capture device 30.

The first trained model LM1 is used in extracting an image of a person from a captured image by an identifier 112 (to be described later).

The first trained model LM1 is generated through training with teaching data in a training phase. The teaching data to be used for generating the first trained model LM1 includes a plurality of sets of a captured image and an image of a person included in the captured image.

The first trained model LM1 is generated by an external apparatus different from the information processing apparatus 10. The first trained model LM1 is preferably generated by a server (not illustrated). In this case, the information processing apparatus 10 acquires the first trained model LM1 from the server (not illustrated) via the communication network NET.

The second trained model LM2 is used in further extracting an image showing the pair of MR glasses 50 by a calculator 113 (to be described later), from a person image showing one person identified by the identifier 112.

The second trained model LM2 is generated through training with teaching data in a training phase. The teaching data to be used for generating the second trained model LM2 includes a plurality of sets of a captured image and an image of the pair of MR glasses 50 included in the captured image.

The second trained model LM2 is generated by an external apparatus different from the information processing apparatus 10. The second trained model LM2 is preferably generated by the server (not illustrated). In this case, the information processing apparatus 10 acquires the second trained model LM2 from the server (not illustrated) via the communication network NET.

The third trained model LM3 is used in extracting a building image from a captured image by the calculator 113 (to be described later).

The third trained model LM3 is generated through training with teaching data in a training phase. The teaching data to be used for generating the third trained model LM3 includes a plurality of sets of a captured image and a building image included in the captured image.

The third trained model LM3 is generated by an external apparatus different from the information processing apparatus 10. The third trained model LM3 is preferably generated by the server (not illustrated). In this case, the information processing apparatus 10 acquires the third trained model LM3 from the server (not illustrated) via the communication network NET.

The map data MD includes a captured image previously captured by, for example, a stereo camera configured to simultaneously capture images of a target object from different directions, a feature value of a feature point included in the captured image, and absolute position information associated with the feature point. The captured image particularly includes an image of a building unique to an area of land. The absolute position information associated with the feature point refers to global position information and refers to position information in the global coordinate system.

The communication device 13 is hardware serving as a transmission and reception device for communicating with another apparatus. For example, the communication device 13 is called a network device, a network controller, a network card, a communication module. The communication device 13 may include a connector for wire connection, and it may include an interface circuit compatible with the connector. The communication device 13 may include a wireless communication interface. Examples of the connector for wire connection and interface circuit may include products conforming to a wired LAN, IEEE 1394, and a USB. Examples of the wireless communication interface may include products conforming to a wireless LAN, and Bluetooth (registered trademark).

The display 14 is a device that displays an image and text information. The display 14 is controlled by the processor 11 to display various images. Preferable examples of the display 14 may include various display panels such as a liquid crystal display panel and an organic EL display panel.

The input device 15 receives a manipulation by an administrator of the information processing system 1. For example, the input device 15 includes a pointing device such as a keyboard, a touch pad, a touch panel, or a mouse. The input device 15 that includes a touch panel may serve as the display 14.

The processor 11 reads the control program PR3 from the memory device 12 and executes the control program PR3 to thereby function as an acquirer 111, the identifier 112, the calculator 113, a comparator 114, and a transmitter 115.

The acquirer 111 acquires from the terminal device 40 first captured image information indicating a captured image captured by the image capture device 56 of the pair of MR glasses 50. More specifically, the acquirer 111 acquires from the terminal device 40 first captured image information indicating a captured image captured by the image capture device 56 of the pair of MR glasses 50 and showing the outside. The acquirer 111 acquires from the terminal device 40 first position information as provisional position information indicating a position of the wearable device 20.

The acquirer 111 acquires image capture position information indicating an absolute position of the image capture device 30 in the global coordinate system. More specifically, the acquirer 111 may acquire the image capture position information from the image capture device 30. Alternatively, the acquirer 111 may acquire image capture position information stored in the memory device 12. The image capture position information is higher in accuracy than the provisional position information.

The acquirer 111 acquires from the image capture device 30 second captured image information indicating a captured image. More specifically, the acquirer 111 acquires from the image capture device 30 second captured image information indicating a captured image showing a person wearing the wearable device 20. As described above, since the image capture device 30 is, for example, a stereo camera, the second captured image information includes distance information indicating a distance from the image capture device 30 to the image capture target.

The identifier 112 extracts one or more person images from a captured image indicated by second captured image information, using the first trained model LM1. The identifier 112 identifies, based on first position information as provisional position information acquired by the acquirer 111, one person wearing the wearable device 20 corresponding to the provisional position information, from among persons shown in the extracted one or more person images.

More specifically, as described above, the second captured image information includes vector information indicating a distance from the image capture device 30 to the image capture target and a direction of the image capture target relative to the image capture device 30. Pixels in one or more person images are each associated with a corresponding one of multiple pieces of vector information. The identifier 112 identifies, as the one person wearing the wearable device 20 corresponding to the provisional position information, a person shown in a person image including vector information that is nearest to the first position information as the provisional position information.

The identifier 112 extracts an image showing the pair of MR glasses 50, from the person image showing the identified one person, using the second trained model LM2.

The calculator 113 calculates third position information as self-position information on the wearable device 20, based on the first captured image information acquired by the acquirer 111. For example, the calculator 113 extracts an image of a building unique to an area of land in which the wearable device 20 is located, in the captured image indicated by the first captured image information, using the third trained model LM3. The calculator 113 calculates a position of the extracted building by making reference to the map data MD stored in the memory device 12. The calculator 113 calculates a distance from the pair of MR glasses 50 to the building and a direction of the building relative to the pair of MR glasses 50, based on the image of the building extracted from the first captured image information. Finally, the calculator 113 calculates third position information as self-position information on the wearable device 20, based on the position of the building, the distance from the pair of MR glasses 50 to the building, and the direction of the building relative to the pair of MR glasses 50.

The calculated third position information is transmitted to the terminal device 40 by the transmitter 115 (to be described later) in a usual state.

The calculator 113 calculates self-position accuracy information, based on the first captured image information acquired by the acquirer 111.

The self-position information calculated based on the first captured image information is deteriorated in accuracy with a decrease in feature value included in the captured image captured by the image capture device 56 of the pair of MR glasses 50, for example, a decrease in feature point included in the image of the building unique to the land in which the wearable device 20 shown in the captured image is located. Therefore, the calculator 113 calculates the self-position accuracy information, based on the feature value included in the captured image indicated by the first captured image information. Alternatively, the calculator 113 may perform matching between the image of the building included in the captured image indicated by the first captured image information and images of buildings included in the map data MD, and may calculate the self-position accuracy information in accordance with a degree of the matching. As yet another alternative, the calculator 113 may perform matching between the feature point included in the captured image indicated by the first captured image information and feature points included in the map data MD. The calculator 113 may then calculate the self-position accuracy information in accordance with a degree of the matching.

The calculator 113 calculates second position information as self-position information indicating a position of the wearable device 20 worn by the one person identified by the identifier 112, using the image capture position information. More specifically, the calculator 113 extracts, from the person image showing the one person identified by the identifier 112, an image of a portion occupied by the pair of MR glasses 50 worn by the one person, using the second trained model LM2. The calculator 113 calculates relative position information on the pair of MR glasses 50 worn by the one person with respect to a position of the image capture device 30, based on multiple pieces of vector information respectively associated with pixels in the extracted image of the portion occupied by the pair of MR glasses 50. The calculator 113 may regard, among the multiple pieces of vector information respectively associated with the pixels in the image of the portion occupied by the pair of MR glasses 50, vector information associated with a nearest one of the pixels to the image capture device 30, as the relative position information indicating the relative position of the wearable device 20 worn by the one person. The calculator 113 may alternatively regard, among the multiple pieces of vector information respectively associated with the pixels in the image of the portion occupied by the pair of MR glasses 50, vector information associated with a farthest one of the pixels from the image capture device 30, as the relative position information indicating the relative position of the wearable device 20 worn by the one person. The calculator 113 then adds the relative position information on the wearable device 20 to the image capture position information indicating the absolute position of the image capture device 30, thereby calculating, as second position information, self-position information indicating the absolute position of the wearable device 20.

The comparator 114 compares the self-position accuracy information calculated by the calculator 113, with a threshold. Particularly when the self-position accuracy information is less than the threshold (when the accuracy of the third position information is lower than the threshold), the transmitter 115 outputs to the terminal device 40 a request signal for requesting the first position information as the provisional position information on the wearable device 20.

The transmitter 115 supplies the third position information as the self-position information on the wearable device 20, calculated by the calculator 113 based on the first captured image information, to the terminal device 40 through the communication device 13 in the usual state.

The acquisition of the provisional position information by the acquirer 111 from the terminal device 40 triggers transmission of an image capture instruction signal from the transmitter 115 to the image capture device 30 through the communication device 13. The image capture device 30 captures an image of the person wearing the wearable device 20 in response to the image capture instruction signal acquired from the 15 information processing apparatus 10.

The transmitter 115 transmits the second position information as the self-position information on the wearable device 20, calculated by the calculator 113 based on the image capture position information, to the terminal device 40 through the communication device 13.

1.2: Operation According to First Embodiment

Figure 10:
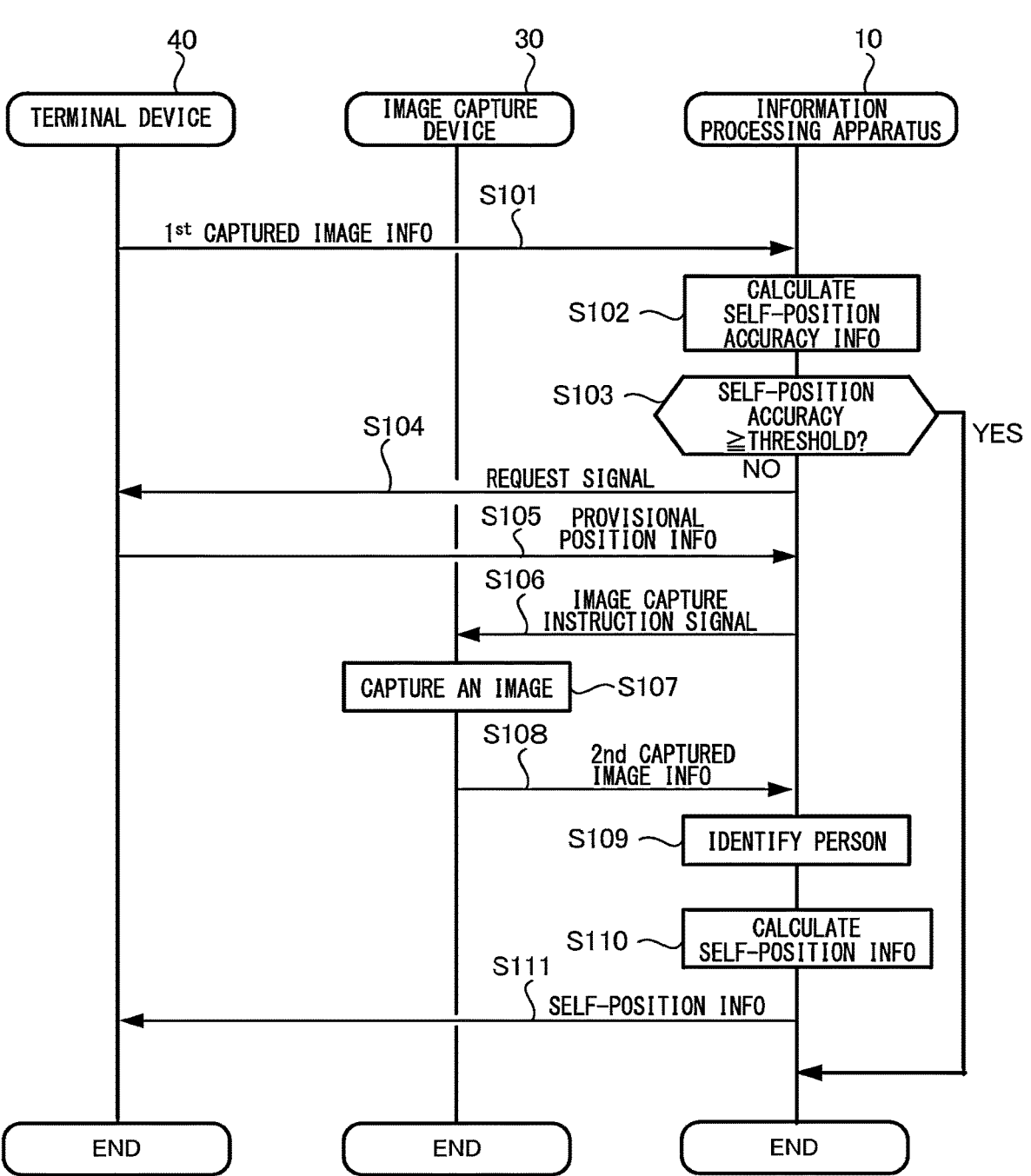
FIG. 10 is a flowchart illustrating operation of the information processing system 1 according to the first embodiment.

FIG. 10 is a flowchart illustrating operation of the information processing system 1 according to the first embodiment. With reference to FIG. 10, next, a description will be given of the operation of the information processing system 1.

In step S101, the processor 41 of the terminal device 40 acts as the transmitter 414 to transmit first captured image information acquired from the pair of MR glasses 50, to the information processing apparatus 10.

In step S102, the processor 11 of the information processing apparatus 10 acts as the calculator 113 to calculate self-position accuracy information, based on the first captured image information acquired from the terminal device 40.

In step S103, the processor 11 of the information processing apparatus 10 acts as the comparator 114 to compare the calculated self-position accuracy information with the threshold. When the self-position accuracy information is equal to or greater than the threshold, that is, when a determination result in step S103 is true, the information processing apparatus 10 ends the entire processing. When the self-position accuracy information is less than the threshold, that is, when the determination result in step S103 is false, the information processing apparatus 10 performs processing in step S104.

In step S104, the processor 11 of the information processing apparatus 10 acts as the transmitter 115 to transmit to the terminal device 40 a request signal for requesting first position information as provisional position information on the wearable device 20.

In step S105, the processor 41 of the terminal device 40 acts as the transmitter 414 to transmit to the information processing apparatus 10 first position information as provisional position information on the wearable device 20, the first position information being acquired from the pair of MR glasses 50.

In step S106, the processor 11 of the information processing apparatus 10 acts as the transmitter 115 to transmit an image capture instruction signal to the image capture device 30.

In step S107, the image capture device 30 captures an image of a person wearing the wearable device 20 including the terminal device 40 and the pair of MR glasses 50.

In step S108, the image capture device 30 transmits to the information processing apparatus 10 second captured image information indicating the captured image captured by the image capture device 30.

In step S109, the processor 11 of the information processing apparatus 10 acts as the identifier 112 to extract one or more person images from the captured image indicated by the second captured image information. The processor 11 acts as the identifier 112 to identify, based on the first position information as the provisional position information, one person wearing the wearable device 20 corresponding to the provisional position information, from among persons shown in the extracted one or more person images.

In step S110, the processor 11 of the information processing apparatus 10 acts as the calculator 113 to calculate self-position information indicating a position of the wearable device 20 worn by the one person identified in step S109, using the image capture position information.

In step S111, the processor 11 of the information processing apparatus 10 acts as the transmitter 115 to transmit the self-position information calculated in step S110, to the terminal device 40 through the communication device 13. Thereafter, the processor 41 of the terminal device 40 acts as the transmitter 414 to transmit the self-position information acquired from the information processing apparatus 10, to the pair of MR glasses 50.

1.3: Advantageous Effects According to First Embodiment

As described above, the information processing apparatus 10 includes the acquirer 111, the identifier 112, the calculator 113, and the transmitter 115. The acquirer 111 acquires captured image information indicating a captured image captured by the image capture device 30, image capture position information indicating a position of the image capture device 30, and provisional position information indicating a position of the wearable device 20. The identifier 112 identifies, based on the captured image information and the provisional position information, a person wearing the wearable device 20, from one or more person images included in the captured image. The calculator 113 calculates self-position information indicating a position of the wearable device 20 worn by the person identified by the identifier 112, using the image capture position information. The transmitter 115 supplies the self-position information to the wearable device 20. The image capture position information is higher in accuracy than the provisional position information.

Since the information processing apparatus 10 has the foregoing configuration, the pair of MR glasses 50 is configured to acquire its position more accurately. In particular, the calculator 113 calculates self-position information, using image capture position information higher in accuracy than provisional position information that can be acquired since the pair of MR glasses 50 includes the GPS device 54. The calculator 113 is thus configured to calculate the self-position information more accurately.

The image capture position information indicates an absolute position of the image capture device 30. The self-position information indicates an absolute position of the wearable device 20. The calculator 113 calculates, based on the captured image information, relative position information indicating a relative position of the wearable device 20 with respect to the position of the image capture device 30 indicated by the image capture position information. The calculator 113 calculates the self-position information, based on the image capture position information and the relative position information.

Since the information processing apparatus 10 has the foregoing configuration, the calculator 113 is configured to calculate the self-position information indicating the absolute position of the wearable device 20, from the image capture position information indicating the absolute position of the image capture device 30 and the relative position information indicating the relative position of the wearable device 20 with respect to the position of the image capture device 30.

2: Second Embodiment

With reference to FIGS. 11 to 15, next, a description will be given of a configuration of an information processing system 1A including an information processing apparatus 10A according to a second embodiment of the present invention. In the following, the same constituent elements as those described in the first embodiment are denoted with the same reference signs for simplification of the description; therefore, the functional description thereof will not be given. In the following, a description will be mainly given of differences between the second embodiment and the first embodiment for simplification of description.

Figure 11:
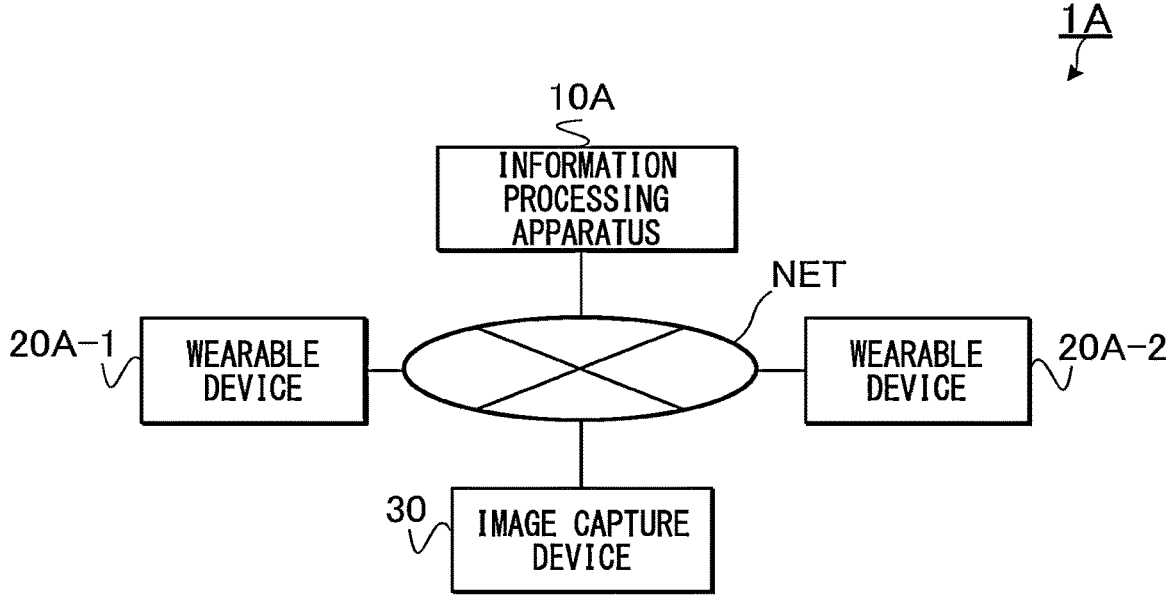
FIG. 11 is a diagram illustrating a general configuration of an information processing system 1A according to a second embodiment.

2.1: Configuration According to First Embodiment 2.1.1: General Configuration FIG. 11 is a diagram illustrating a general configuration of the information processing system 1A according to the second embodiment of the present invention. The information processing system LA is different from the information processing system 1 according to the first embodiment in that the information processing system 1A includes an information processing apparatus 10A instead of the information processing apparatus 10, and a wearable device 20A instead of the wearable device 20. An image capture device 30 simultaneously captures an image of a first person wearing a first wearable device 20A-1 and an image of a second person wearing a second wearable device 20A-2.

Figure 12:
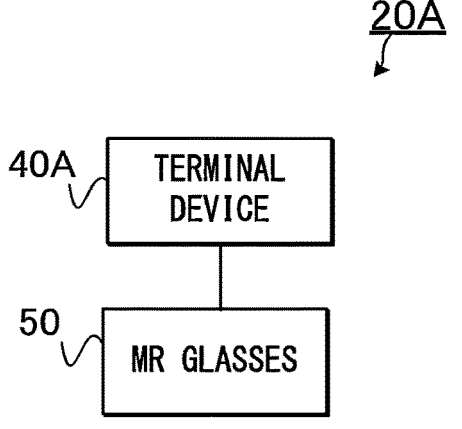
FIG. 12 is a block diagram illustrating a configuration example of a wearable device 20A according to the second embodiment.

FIG. 12 is a block diagram illustrating a configuration example of the wearable device 20A. The wearable device 20A is different from the wearable device 20 according to the first embodiment in that the wearable device 20A includes a terminal device 40A instead of the terminal device 40.

2.1.2: Configuration of Information Processing Apparatus

Figure 13:
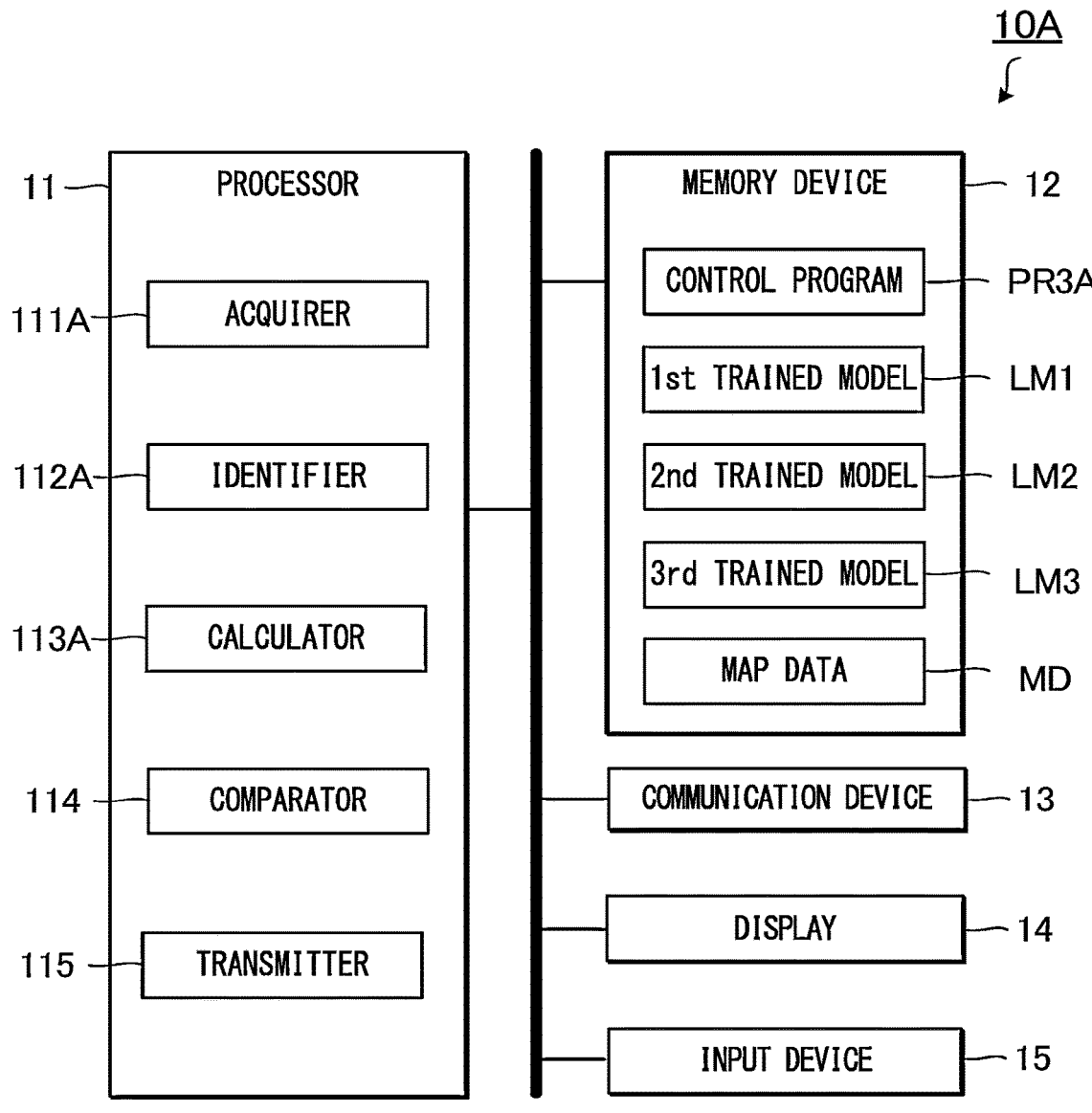
FIG. 13 is a block diagram illustrating a configuration example of an information processing apparatus 10A according to the second embodiment.
Figure 14:
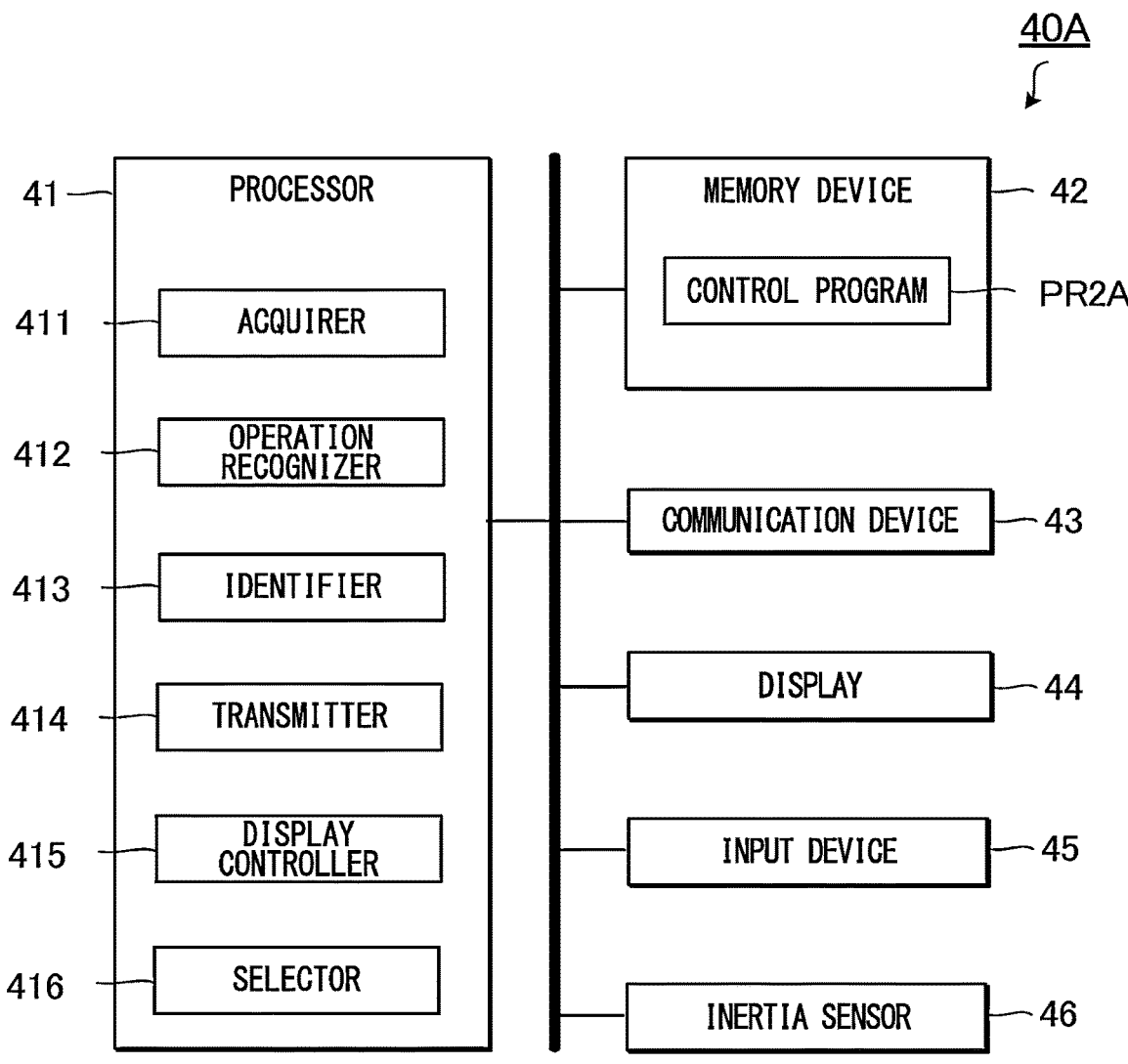
FIG. 14 is a block diagram illustrating a configuration example of a terminal device 40A according to the second embodiment.

FIG. 13 is a block diagram illustrating a configuration example of the information processing apparatus 10A. The information processing apparatus 10A is different from the information processing apparatus 10 according to the first embodiment in that the information processing apparatus 10A includes a processor 11A instead of the processor 11. The processor 11A is different from the processor 11 according to the first embodiment in that the processor 11A includes an acquirer 111A instead of the acquirer 111, an identifier 112A instead of the identifier 112, and a calculator 113A instead of the calculator 113. A memory device 12 stores a control program PR3A instead of the control program PR3 according to the first embodiment.

Unlike the acquirer 111, the acquirer 111A does not necessarily acquire first position information as provisional position information.

The identifier 112A extracts a plurality of person images from a captured image indicated by second captured image information. The identifier 112A then identifies the first person wearing the first wearable device 20A-1 and the second person wearing the second wearable device 20A-2, from among persons shown in the plurality of extracted person images. The identifier 112A extracts an image of a pair of MR glasses 50-1 from a person image showing the first person. The identifier 112A extracts an image of a pair of MR glasses 50-2 from a person image showing the second person.

The calculator 113A calculates self-position information indicating a first position of the first wearable device 20A-1 and a second position of the second wearable device 20A-2, using image capture position information. As a result, the self-position information to be transmitted by a transmitter 115 to a terminal device 40A-1 of the first wearable device 20A-1 and a terminal device 40A-2 of the second wearable device 20A-2 indicates both the first position of the first wearable device 20A-1 and the second position of the second wearable device 20A-2.

2.1.3: Configuration of Terminal Device

FIG. 13 is a block diagram illustrating a configuration example of the terminal device 40A. The terminal device 40A is different from the terminal device 40 according to the first embodiment in that the terminal device 40A includes a processor 41A instead of the processor 41. The processor 41A further includes a selector 416 in addition to the constituent elements of the processor 41 according to the first embodiment. A memory device 42 stores a control program PR2A instead of the control program PR2 according to the first embodiment.

The selector 416 selects one of the first position and the second position indicated by the self-position information acquired from the information processing apparatus 10A, based on a position indicated by provisional position information stored in the memory device 42. More specifically, the selector 416 selects self-position information indicating the nearer of the first position and the second position to the position indicated by the provisional position information.

When the terminal device 40A is the terminal device 40A-1, the memory device 42 stores first provisional position information as the provisional position information. The selector 416 selects self-position information indicating the first position, of the first position and the second position, as a position nearer to a position indicated by the first provisional position information.

When the terminal device 40A is the terminal device 40A-2, the memory device 42 stores second provisional position information as the provisional position information. The selector 416 selects self-position information indicating the second position, of the first position and the second position, as a position nearer to a position indicated by the second provisional position information.

2.2: Operation According to Second Embodiment

Figure 15:
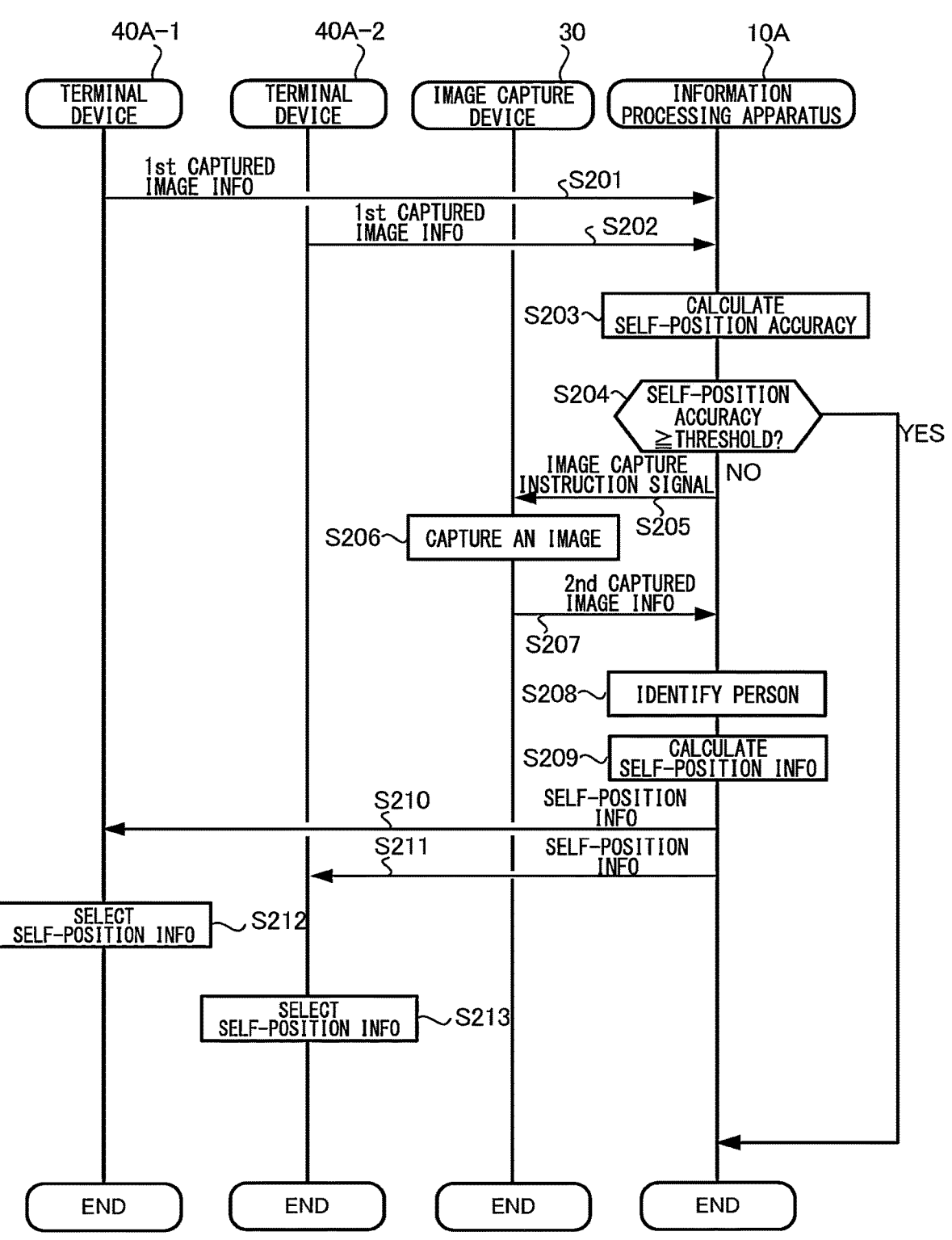
FIG. 15 is a flowchart illustrating operation of the information processing system 1A according to the second embodiment.

FIG. 15 is a flowchart illustrating operation of the information processing system 1A according to the second embodiment. With reference to FIG. 15, next, a description will be given of the operation of the information processing system 1A.

In step S201, the processor 41A of the terminal device 40A-1 acts as a transmitter 414 to transmit first captured image information acquired from the pair of MR glasses 50-1, to the information processing apparatus 10.

In step S202, the processor 41A of the terminal device 40A-2 acts as a transmitter 414 to transmit first captured image information acquired from the pair of MR glasses 50-2, to the information processing apparatus 10.

In step S203, the processor 11A of the information processing apparatus 10A acts as the calculator 113A to calculate self-position accuracy information, based on the first captured image information acquired from the terminal device 40A-1. The processor 11A of the information processing apparatus 10A acts as the calculator 113A to calculate self-position accuracy information, based on the first captured image information acquired from the terminal device 40A-2.

In step S204, the processor 11A of the information processing apparatus 10A acts as a comparator 114 to compare the calculated self-position accuracy information with a threshold. When the two pieces of self-position accuracy information calculated in step S203 are equal to or greater than the threshold, that is, when a determination result in step S204 is true, the terminal device 40A-1 ends the entire processing. When one of the two pieces of self-position accuracy information calculated in step S203 is less than the threshold, that is, when the determination result in step S204 is false, the information processing apparatus 10A performs processing in step S205.

In step S205, the processor 11A of the information processing apparatus 10A acts as the transmitter 115 to transmit an image capture instruction signal to the image capture device 30.

In step S206, the image capture device 30 simultaneously captures an image of the person wearing the first wearable device 20A-1 including the terminal device 40A-1 and the pair of MR glasses 50-1 and an image of the person wearing the second wearable device 20A-2 including the terminal device 40A-2 and the pair of MR glasses 50-2.

In step S207, the image capture device 30 outputs to the information processing apparatus 10A second captured image information indicating the captured images captured by the image capture device 30.

In step S208, the processor 11A of the information processing apparatus 10A acts as the identifier 112A to extract a plurality of person images from the captured images indicated by the second captured image information. The processor 11A acts as the identifier 112A to identify the first person wearing the first wearable device 20A-1 and the second person wearing the second wearable device 20A-2, from among persons shown in the plurality of extracted person images.

In step S209, the processor 11A of the information processing apparatus 10A acts as the calculator 113A to calculate self-position information indicating a first position as an absolute position of the first wearable device 20A-1 worn by the first person identified in step S208 and a second position as an absolute position of the second wearable device 20A-2 worn by the second person identified in step S208, using the image capture position information.

In step S210, the processor 11A of the information processing apparatus 10A acts as the transmitter 115 to transmit the self-position information calculated in step S209 to the terminal device 40A-1 through a communication device 13.

In step S211, the processor 11A of the information processing apparatus 10A acts as the transmitter 115 to transmit the self-position information calculated in step S209 to the terminal device 40A-2 through the communication device 13.

In step S212, the processor 41A of the terminal device 40A-1 acts as the selector 416 to select self-position information indicating the first position, of the first position and the second position, as a position nearer to a position indicated by first provisional position information. Thereafter, the processor 41A of the terminal device 40A-1 acts as the transmitter 414 to supply the self-position information selected by the selector 416, to the pair of MR glasses 50-1.

In step S213, the processor 41A of the terminal device 40A-2 acts as the selector 416 to select self-position information indicating the second position, of the first position and the second position, as the position nearer to a position indicated by second provisional position information. Thereafter, the processor 41A of the terminal device 40A-2 acts as the transmitter 414 to supply the self-position information selected by the selector 416, to the pair of MR glasses 50-2.

2.3: Advantageous Effects According to Second Embodiment

As described above, the information processing apparatus 10A includes the acquirer 111, the identifier 112A, the calculator 113A, and the transmitter 115. The acquirer 111 acquires captured image information indicating a captured image captured by the image capture device 30, and image capture position information indicating a position of the image capture device 30. The identifier 112A identifies, based on the captured image information, the first person wearing the first wearable device 20A-1 shown in the captured image and the second person wearing the second wearable device 20A-2 shown in the captured image. The calculator 113A calculates self-position information indicating a first position of the first wearable device 20A-1 and a second position of the second wearable device 20A-2, using image capture position information. The transmitter 115 supplies the self-position information to the first wearable device 20A-1 and the second wearable device 20A-2. The first wearable device 20A-1 stores first provisional position information indicating the first position. The second wearable device 20A-2 stores second provisional position information indicating the second position. The first wearable device 20A-1 identifies a position of the first wearable device 20A-1 by selecting one of the first position and the second position indicated by the self-position information, based on the position indicated by the first provisional position information. The second wearable device 20A-2 identifies a position of the second wearable device 20A-2 by selecting one of the first position and the second position indicated by the self-position information, based on the position indicated by the second provisional position information. The image capture position information is greater in accuracy than the provisional position information.

Since the information processing apparatus 10A has the foregoing configuration, the pair of MR glasses 50-1 and the pair of MR glasses 50-2 are each configured to acquire its position more accurately. In particular, the calculator 113A calculates self-position information, using image capture position information greater in accuracy than provisional position information that can be acquired since the pair of MR glasses 50-1 in the first wearable device 20A-1 includes a GPS device 54 and provisional position information that can be acquired since the pair of MR glasses 50-2 in the second wearable device 20A-2 includes a GPS device 54. The calculator 113A is thus configured to calculate the self-position information more accurately.

The image capture position information indicates an absolute position of the image capture device 30. The self-position information indicates an absolute position of the first wearable device 20A-1 and an absolute position of the second wearable device 20A-2. The calculator 113A calculates, based on the captured image information, relative position information indicating relative positions of the first wearable device 20A-1 and second wearable device 20A-2 with respect to a position of the image capture device 30 indicated by the image capture position information. The calculator 113A calculates the self-position information, based on the image capture position information and the relative position information.

Since the information processing apparatus 10A has the foregoing configuration, the calculator 113A is configured to calculate the self-position information indicating the absolute positions of the first wearable device 20A-1 and second wearable device 20A-2, from the image capture position information indicating the absolute position of the image capture device 30 and the relative position information indicating the relative positions of the first wearable device 20A-1 and second wearable device 20A-2 with respect to the position of the image capture device 30.

3: Modifications

The present disclosure is not limited to the embodiments exemplified above. Specific modified aspects are exemplified below. Two or more aspects optionally selected from the following examples may be combined.

3.1: Modification 1

In each of the information processing system 1 according to the first embodiment and the information processing system 1A according to the second embodiment, the image capture device 30 is, for example, a stereo camera. However, the image capture device 30 is not limited to a stereo camera as long as the image capture device 30 is configured to acquire vector information indicating a distance from the image capture device 30 to an image capture target and a direction of the image capture target relative to the image capture device 30. For example, the image capture device 30 may include a projection device that emits light from the image capture device 30 onto the image capture target, and a distance measurement device that calculates a distance from the image capture device 30 to the image 20 capture target, based on a phase of reflected light from the image capture target. Alternatively, the image capture device 30 may subject a captured image captured by the image capture device 30 to image processing, thereby acquiring distance information indicating a distance from the image capture device 30 to the image capture target. Still alternatively, the image capture device 30 may have another depth estimation function.

3.2: Modification 2

In the information processing system 1 according to the first embodiment, the image capture device 30 captures an image of the person wearing the wearable device 20. In the information processing system 1A according to the second embodiment, the image capture device 30 simultaneously captures an image of the first person wearing the first wearable device 20A-1 and an image of the second person wearing the second wearable device 20A-2. Alternatively, an image capture device different from the image capture device 30 may capture an image of the person wearing the wearable device 20 or may capture an image of the first person wearing the first wearable device 20A-1 and an image of the second person wearing the second wearable device 20A-2. For example, in the information processing system 1 according to the first embodiment, an image capture device 56 of a second wearable device 20 different from the wearable device 20 may capture an image of the person wearing the wearable device 20. Likewise, in the information processing system 1A according to the second embodiment, an image capture device 56 of a third wearable device 20A-3 different from the first wearable device 20A-1 and the second wearable device 20A-2 may simultaneously capture an image of the first person wearing the first wearable device 20A-1 and an image of the second person wearing the second wearable device 20A-2. The information processing system 1 according to the first embodiment having the foregoing configuration is configured to capture an image of the person wearing the wearable device 20, without the image capture device 30 provided separately from the wearable device 20. The information processing system 1A according to the second embodiment having the foregoing configuration is configured to capture an image of the person wearing the wearable device 20A, without the image capture device 30 provided separately from the wearable device 20A.

3.3: Modification 3

In the information processing system 1 according to the first embodiment, the calculator 113 of the information processing apparatus 10 calculates third position information as self-position information on the wearable device 20, based on first captured image information acquired by the acquirer 111 from the pair of MR glasses 50. The comparator 114 of the information processing apparatus 10 compares self-position accuracy information acquired by the acquirer 111 from the information processing apparatus 10, with the threshold. The same applies to the information processing system 1A according to the second embodiment. However, the terminal device 40 or the terminal device 40A may include the calculator 113 and the comparator 114, in place of the information processing apparatus 10 or the information processing apparatus 10A.

3.4: Modification 4

In the information processing system 1 according to the first embodiment, the calculator 113 of the information processing apparatus 10 calculates relative position information on a position of the wearable device 20 relative to the image capture device 30. Likewise, in the information processing system 1A according to the second embodiment, the calculator 113A of the information processing apparatus 10 calculates relative position information on a position of the first wearable device 20A-1 relative to the image capture device 30 and relative position information on a position of the second wearable device 20A-2 relative to the image capture device 30. Alternatively, the image capture device 30 may calculate relative position information, in place of the information processing apparatus 10 and the information processing apparatus 10A.

3.5: Modification 5

In the information processing system 1 according to the first embodiment, the terminal device 40 and the pair of MR glasses 50 are provided separately from each other. In the information processing system 1A according to the second embodiment, the terminal device 40A and the pair of MR glasses 50 are provided separately from each other. However, in the embodiments of the present invention, the method of implementing the terminal device 40 or 40A and the pair of MR glasses 50 is not limited thereto. For example, the terminal device 40 or 40A and the pair of MR glasses 50 may be implemented in a single housing in such a manner that the pair of MR glasses 50 has the same functions as those of the terminal device 40 or 40A.

4: Other Matters (1) In the foregoing embodiments, examples of the memory device 12, memory device 42, and memory device 52 include, but are not limited to, a ROM and a RAM. Additional examples thereof may include, but are not limited to, a flexible disc, a magneto-optical disc (e.g., a compact disc, a digital versatile disc, a Blu-ray (registered trademark) disc), a smart card, a flash memory device (e.g., a card, a stick, a key drive), a compact disc-ROM (CD-ROM), a register, a removable disc, a hard disk, a floppy (registered trademark) disk, a magnetic strip, a database, a server, and other appropriate storage media. The programs may be transmitted from a network via a telecommunication line. The programs may alternatively be transmitted from the communication network NET via the telecommunication line.

(2) The information, the signals, and the like described in the foregoing embodiments may be represented using any of a variety of different technologies. For example, data, an instruction, a command, information, a signal, a bit, a symbol, a chip, and the like mentioned throughout the foregoing description may be represented by a voltage, a current, an electromagnetic wave, a magnetic field or a magnetic particle, an optical field or a photon, or a given combination thereof.

(3) In the foregoing embodiments, for example, input or output information may be stored in a specific location (e.g., a memory) or may be managed using a management table. For example, information to be input or output may be overwritten, updated, or additionally written. The output information may be deleted. The input information may be transmitted to another apparatus.

(4) In the foregoing embodiments, a determination may be made using a value (0 or 1) represented by one bit, may be made using a true or false value (Boolean), or may be made by a comparison between numerical values (e.g., a comparison with a predetermined value).

(5) With regard to the processing procedures, the sequences, the flowcharts, and the like exemplified in the foregoing embodiments, the order may be changed unless a conflict arises. For example, the methods described in the present disclosure present various step elements in an exemplary order; however, the methods are not limited to the presented specific order.

(6) Each function illustrated in FIGS. 1 to 15 is implemented by a given combination of at least one of hardware and software. The method of implementing each functional block is not particularly limited. Each functional block may be implemented using a physically or logically coupled single device or may be implemented using two or more devices that are physically or logically separated from each other, by connecting the two or more devices directly or indirectly (e.g., in a wired or wireless manner). Each functional block may be implemented by a combination of the single device, or two or more devices, with software.

(7) The programs exemplified in the foregoing embodiments should be broadly construed to involve an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the programs are each called software, firmware, middleware, microcode, hardware description language, or another name.

For example, software, a command, and information may be transmitted and received via a transmission medium. When software is transmitted from a website, a server, or another remote source, using at least one of a wired technique (e.g., a coaxial cable, a fiber optic cable, a twisted pair cable, a digital subscriber line (DSL)) and a wireless technique (e.g., infrared light, microwaves), at least one of the wired technique and the wireless technique is included within the definition of the transmission medium.

(8) In the foregoing embodiments, the terms "system" and "network" are used in an interchangeable manner.

(9) The information, the parameters, and the like described in the present disclosure may be represented using an absolute value, may be represented using a relative value from a predetermined value, or may be represented using corresponding other information.

(10) In the foregoing embodiments, each of the information processing apparatus 10, the information processing apparatus 10A, the image capture device 30, the terminal device 40, and the terminal device 40A may be a mobile station (MS). A mobile station may be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable term by one skilled in the art. In the present disclosure, for example, the terms "mobile station", "user terminal", "user equipment (UE)", and "terminal" may be used in an interchangeable manner.

(11) In the foregoing embodiments, the terms "connected" and "coupled" or other given transformations of these terms can refer to any direct or indirect connection or coupling between two or more elements, and can involve the presence of one or more intermediate elements between two elements that are "connected" or "coupled" together. A coupling or connection between elements may be a physical coupling or connection, may be a logical coupling or connection, or may be a combination thereof. For example, the term "connection" may be read as "access". It can be appreciated in the present disclosure that two elements are "connected" or "coupled" together using at least one of one or more electric wires, one or more cables, and one or more printed electrical connections and using, as some non-limiting and non-comprehensive examples, electromagnetic energy at wavelengths in a radio frequency range, a microwave range, and an optical (both visible and invisible) range.

(12) In the foregoing embodiments, the phrase "based on" does not involve "based only on" unless otherwise specified. In other words, the phrase "based on" involves both "based only on" and "based at least on".

(13) The term "determining" as used in the present disclosure may involve a variety of different operations. The term "determining" may involve "judging", "calculating", "computing", "processing", "deriving", "investigating" "looking up, searching for, making an inquiry (e.g., searching a table, a database, or another data structure), and "ascertaining" to be regarded as "determining". The term "determining" may involve "receiving" (e.g., receiving information), "transmitting" (e.g., transmitting information), "inputting", "outputting", and "accessing" (e.g., accessing data in a memory) to be regarded as "determining". The term "determining" may involve "resolving", "selecting", "choosing", "establishing", and "comparing" to be regarded as "determining". That is, the term "determining" may involve a given sort of action to be regarded as "determining". The term "determining" may be read as "assuming", "expecting", or "considering".

(14) In the foregoing embodiments, the terms "include" and "including" as well as transformations of these terms are intended to be open-ended as in the term "comprising". The term "or" as used in the present disclosure is not intended to be an exclusive OR.

(15) In the present disclosure, for example, a singular feature, element, or step preceded with an article such as "a", "an", or "the" in the English translation may be understood as including plural features, elements, or steps.

(16) In the present disclosure, the phrase "A and B differ" may refer to "A and B are different from each other". This phrase may refer to "each of A and B is different from C". For example, the terms "separate" and "couple" may be interpreted as in the term "differ".

(17) The aspects and embodiments described in the present disclosure may be used alone, may be used in combination, or may be used in a switchable manner in accordance with implementation. Notification of predetermined information (e.g., notification about "being X") is not necessarily made explicitly, and may be made implicitly (e.g., the predetermined information is not notified).

Although the present disclosure has been described in detail above, it is obvious to one skilled in the art that the present disclosure is not limited to the embodiments described herein. The present disclosure can be implemented as modifications or variations without departing from the spirit and scope of the present disclosure defined by the recitations in the claims. Therefore, the description in the present disclosure is given for the purpose of exemplification and has no restrictive meaning to the present disclosure.

DESCRIPTION OF REFERENCE SIGNS

1, 1A: information processing system, 10, 10A: information processing apparatus, 11, 11A: processor, 12: memory device, 13: communication device, 14: display, 15: input device, 20, 20A: wearable device, 30: image capture device, 40, 40A: terminal device, 41, 41A: processor, 42: memory device, 43: communication device, 44: display, 45: input device, 46: inertia sensor, 50: pair of MR glasses, 51: processor, 52: memory device, 53: line-of-sight detection device, 54: GPS device, 55: movement detection device, 56: image capture device, 57: communication device, 58: display, 59L, 59R: lens, 91: temple tip, 93: nose bridge, 94, 95: temple, 111, 111A: acquirer, 112, 112A: identifier, 113, 113A: calculator, 114: comparator, 115: transmitter, 411: acquirer, 412: operation recognizer, 413: identifier, 414: transmitter, 415: display controller, 416: selector, 511: acquirer, 512: display controller, LM1: trained model, PR1 to PR3: control program, U1 to U3: user, VO, VO1 to VO5: virtual object.

The invention claimed is:

1. An information processing apparatus comprising:
an acquirer configured to acquire:
captured image information indicating an image captured by an image capture device,
image capture position information indicating a position of the image capture device, and
provisional position information indicating a position of a wearable device;
an identifier configured to identify, based on the captured image information and the provisional position information, a person wearing the wearable device, from among persons indicated by one or more person images included in the captured image;
a calculator configured to calculate self-position information indicating a position of the wearable device worn by the person identified by the identifier, using the image capture position information; and
a transmitter configured to supply the self-position information to the wearable device,
wherein the image capture position information is higher in accuracy than the provisional position information.

2. The information processing apparatus according to claim 1,
wherein the calculator is further configured to:
calculate, based on the captured image information, relative position information indicating a relative position of the wearable device to the position of the image capture device indicated by the image capture position information, and
calculate the self-position information, based on the image capture position information and the relative position information,
wherein the image capture position information indicates an absolute position of the image capture device, and
wherein the self-position information indicates an absolute position of the wearable device.

3. The information processing apparatus according to claim 1,
wherein the wearable device is a first wearable device, and
wherein the image capture device is attached to a second wearable device different from the first wearable device.

4. An information processing apparatus, comprising:
an acquirer configured to acquire:
captured image information indicating an image captured by an image capture device, and
image capture position information indicating a position of the image capture device;
an identifier configured to identify, based on the captured image information:
a first person wearing a first wearable device shown in the captured image, and
a second person wearing a second wearable device shown in the captured image;
a calculator configured to calculate:
self-position information indicating a first position of the first wearable device, and
a second position of the second wearable device, using the image capture position information; and
a transmitter configured to supply the self-position information to the first wearable device and the second wearable device,
wherein the first wearable device is configured to store first provisional position information indicating the first position,
wherein the second wearable device is configured to store second provisional position information indicating the second position,
wherein the first wearable device is configured to identify a position of the first wearable device by selecting one of the first position and the second position indicated by the self-position information, based on the first position indicated by the first provisional position information,
wherein the second wearable device is configured to identify a position of the second wearable device by selecting one of the first position and the second position indicated by the self-position information, based on the second position indicated by the second provisional position information, and
wherein the image capture position information is higher in accuracy than the first provisional position information and the second provisional position information.

5. The information processing apparatus according to claim 1,
wherein the calculator is further configured to:
calculate, based on the captured image information, relative position information indicating relative positions of the first wearable device and second wearable device to the position of the image capture device indicated by the image capture position information,
calculate the self-position information, based on the image capture position information and the relative position information,
wherein the image capture position information indicates an absolute position of the image capture device, and
wherein the self-position information indicates an absolute position of the first wearable device and an absolute position of the second wearable device.

6. The information processing apparatus according to claim 4, wherein the image capture device is attached to a third wearable device different from the first wearable device and the second wearable device.

7. The information processing apparatus according to claim 2,
wherein the wearable device is a first wearable device, and
wherein the image capture device is attached to a second wearable device different from the first wearable device.

8. The information processing apparatus according to claim 5, wherein the image capture device is attached to a third wearable device different from the first wearable device and the second wearable device.

* * * * *